(12) United States Patent
Schaefer et al.

(10) Patent No.: US 8,661,286 B2
(45) Date of Patent: Feb. 25, 2014

(54) QPROCESSOR ARCHITECTURE IN A CLUSTER CONFIGURATION

(75) Inventors: Diane E. Schaefer, North Wales, PA (US); Troy J. Stepan, Phoenixville, PA (US)

(73) Assignee: Unisys Corporation, Blue Bell, PA (US)

( * ) Notice: Subject to any disclaimer, the term of this patent is extended or adjusted under 35 U.S.C. 154(b) by 0 days.

(21) Appl. No.: 12/836,951

(22) Filed: Jul. 15, 2010

(65) Prior Publication Data

US 2011/0289346 A1 Nov. 24, 2011

Related U.S. Application Data

(60) Provisional application No. 61/347,228, filed on May 21, 2010.

(51) Int. Cl.
*G06F 11/00* (2006.01)

(52) U.S. Cl.
USPC .......................................................... 714/4.11

(58) Field of Classification Search
USPC ............................... 714/4.11; 713/1; 711/114
See application file for complete search history.

(56) References Cited

U.S. PATENT DOCUMENTS

| | | | | |
|---|---|---|---|---|
| 2003/0217131 A1* | 11/2003 | Hodge et al. | .................. | 709/223 |
| 2004/0267897 A1* | 12/2004 | Hill et al. | ...................... | 709/217 |
| 2007/0180332 A1* | 8/2007 | Aiello et al. | .................... | 714/43 |
| 2009/0119449 A1* | 5/2009 | Nagaram Chengal | ........ | 711/103 |
| 2010/0064009 A1* | 3/2010 | Chen et al. | .................... | 709/205 |

* cited by examiner

*Primary Examiner* — Yair Leibovich

(74) *Attorney, Agent, or Firm* — Richard J. Gregson; James E. Goepel

(57) ABSTRACT

In general, an appliance that simplifies the creation of a cluster in a computing environment has a fairly straightforward user interface that abstracts out many of the complexities of the typical configuration processes, thereby significantly simplifying the deployment process. By using such appliance, system administrators can deploy an almost turn-key cluster and have the confidence of knowing that the cluster is well tuned for the application/environment that it supports. In addition, the present disclosure allows for configurations and integrations of specialty engines, such as Q processors or J processors, into the cluster. The disclosure provides systems and methods for configuring a cluster, managing a cluster, managing an MQ in a cluster, a user interface for configuring and managing the cluster, an architecture for using specialty engines in a cluster configuration, and interconnect between cluster components, and a file system for use in a cluster.

9 Claims, 22 Drawing Sheets

900

1000

1100

QPROCESSOR ARCHITECTURE IN A CLUSTER CONFIGURATION

CROSS REFERENCE TO RELATED APPLICATIONS

This application is related to and claims the benefit of U.S. Provisional Application Ser. No. 61/347,228, entitled Systems, Computer Program Products, and Method for Providing Clustering, filed May 21, 2010, the disclosure of which is hereby incorporated herein by reference.

The following commonly-assigned patent applications have at least some subject matter in common with the current application:

Ser. No. 12/836,884 entitled "Managing the MQ in the Cluster", filed Jul. 15, 2010, Ser. No. 12/836,858 entitled "The Interconnect Portion of the QProcessor Architecture in a Cluster Configuration", filed Jul. 15, 2010, Ser. No. 12/836,681 entitled "Method for the File System of FIG. 7 for the Cluster", filed Jul. 15, 2010, Ser. No. 12/836,643 entitled "Configuring the Cluster", filed Jul. 15, 2010, Ser. No. 12/836,701 entitled "User Interface for Configuring and Managing the Cluster", filed Jul. 15, 2010, and Ser. No. 12/836,909 entitled "Managing the Cluster", filed Jul. 15, 2010,

TECHNICAL FIELD

The present disclosure relates to server systems, and in particular, the present disclosure relates to high-availability cluster systems.

BACKGROUND

Information technology systems are essential to any modern business. These systems have grown more and more complex and more and more expensive. Often, commodity-type systems are used to save money. These baseline commodity-type systems typically include a single node without the ability to create multiple partitions on the node. This is disadvantageous because if the node fails, the system is down until the node can be repaired or replaced.

For these and other reasons, improvements are desirable.

SUMMARY

In accordance with the following disclosure, the above and other problems are solved by the following:

In general, various embodiments described herein define a set of best practices for a particular computing environment, and provide an appliance that simplifies the creation of a cluster in that environment. The appliance has a fairly straightforward user interface that abstracts out many of the complexities of the typical configuration processes, thereby significantly simplifying the deployment process. By using such appliance, system administrators can deploy an almost turn-key cluster and have the confidence of knowing that the cluster is well tuned for the application/environment that it supports. In addition, the present disclosure allows for configurations and integrations of specialty engines, such as QProcessors (MQ) or JProcessors (Java), into the cluster. The disclosure provides systems and methods for configuring a cluster, managing a cluster, managing WebSphere MQ in a cluster, a user interface for configuring and managing the cluster, an architecture for using specialty engines in a cluster configuration, and interconnect between cluster components, and a file system for use in a cluster.

DETAILED DESCRIPTION

Figure 1:
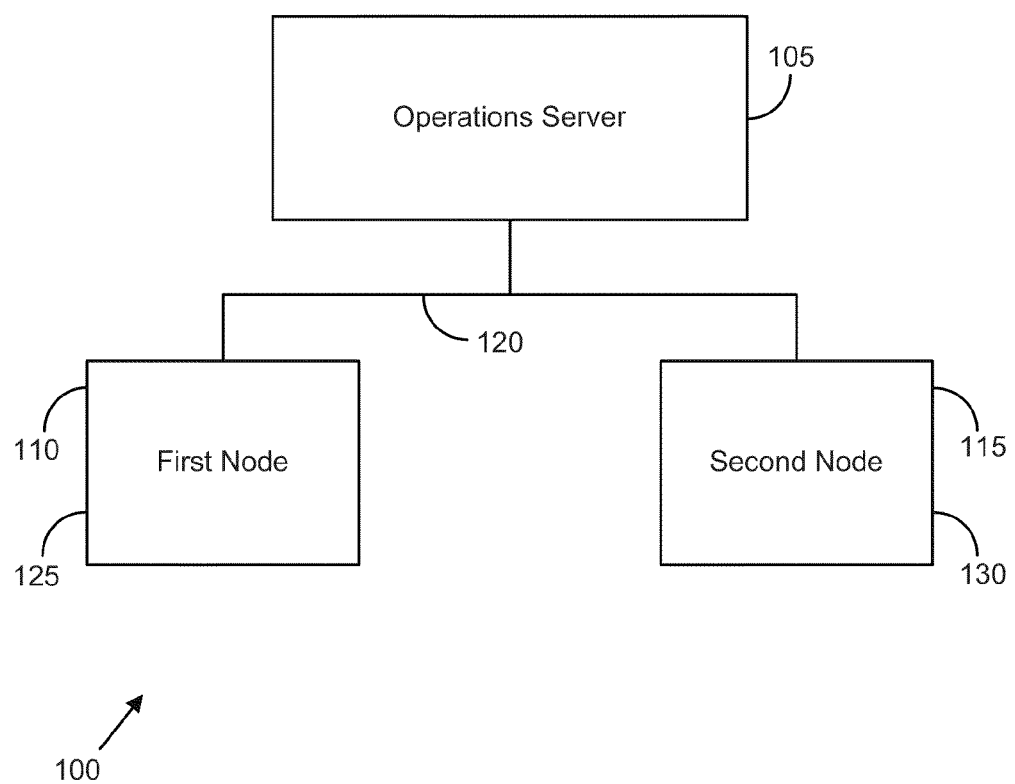
FIG. 1 is a block diagram of an example computing system for providing a standby node and an active node, according to one example embodiment of the present disclosure.

Various embodiments of the present invention will be described in detail with reference to the drawings, wherein like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

The logical operations of the various embodiments of the disclosure described herein are implemented as: (1) a sequence of computer-implemented steps, operations, or procedures running on a programmable circuit within a computer, and/or (2) a sequence of computer-implemented steps, operations, or procedures running on a programmable circuit within a directory system, database, or compiler.

Figure 2:
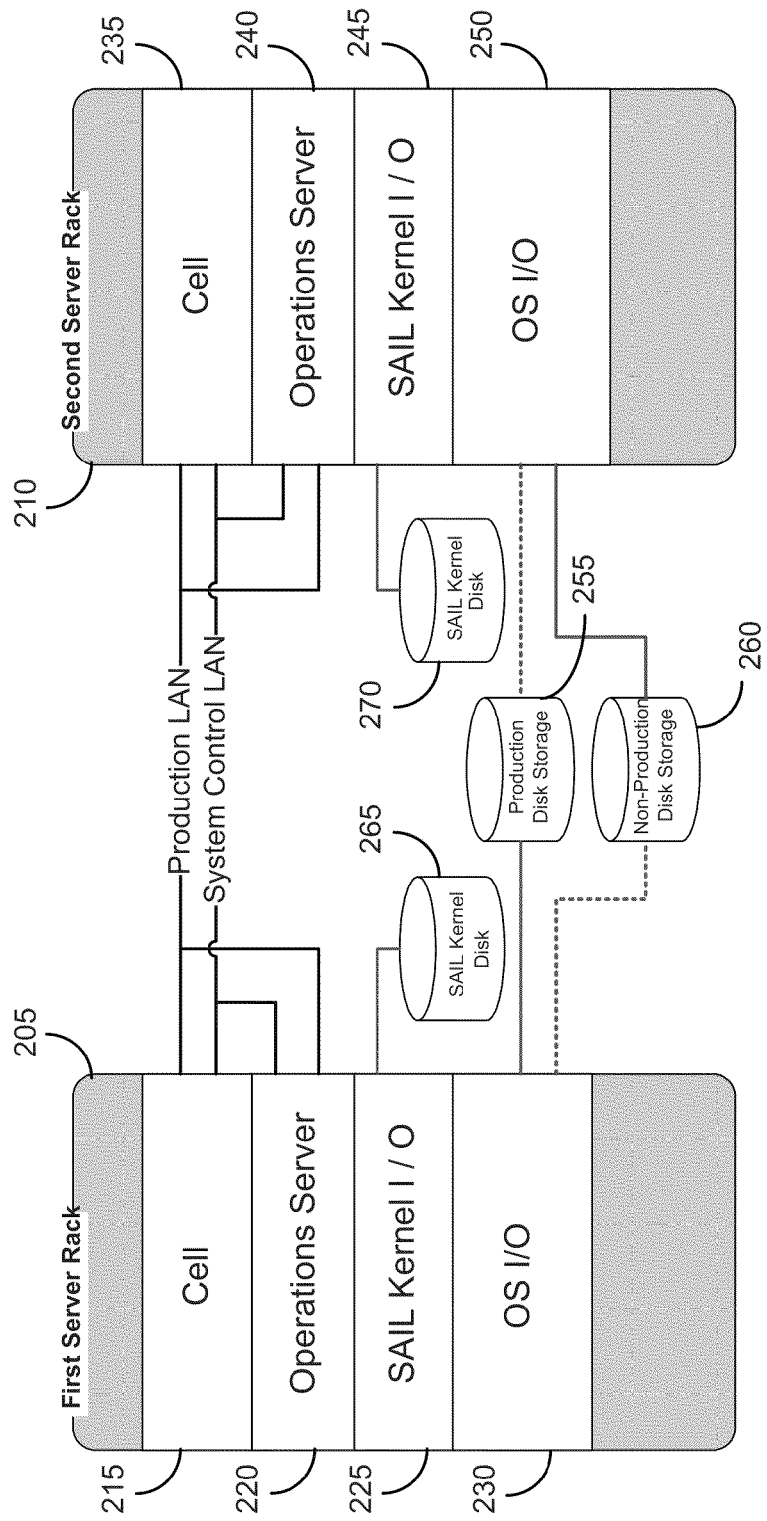
FIG. 2 is a block diagram of an example computing system for providing a standby node, according to one example embodiment of the present disclosure.
Figure 3:
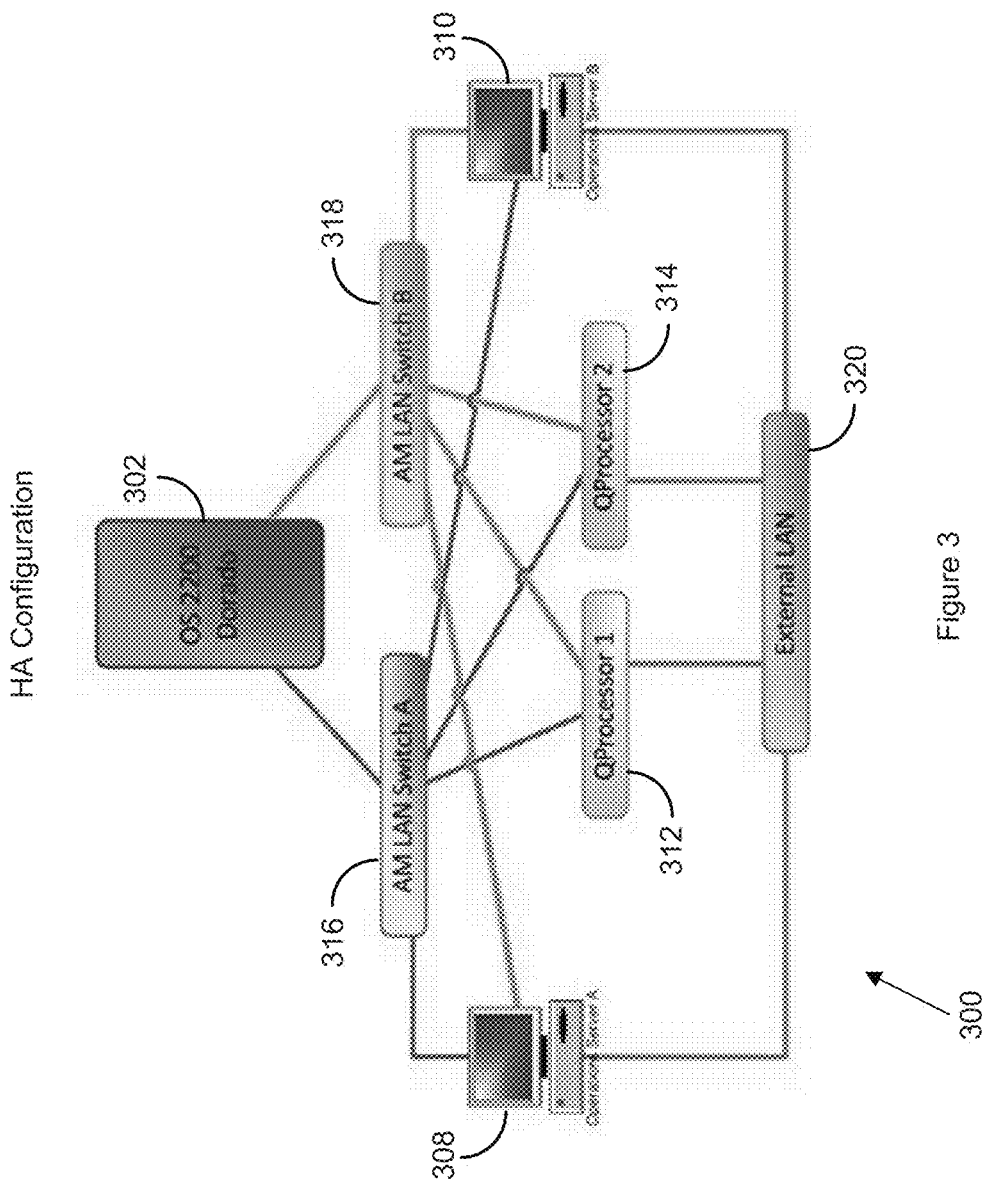
FIG. 3 is a block diagram of an example computing system, according to one example embodiment of the present disclosure.
Figure 4:
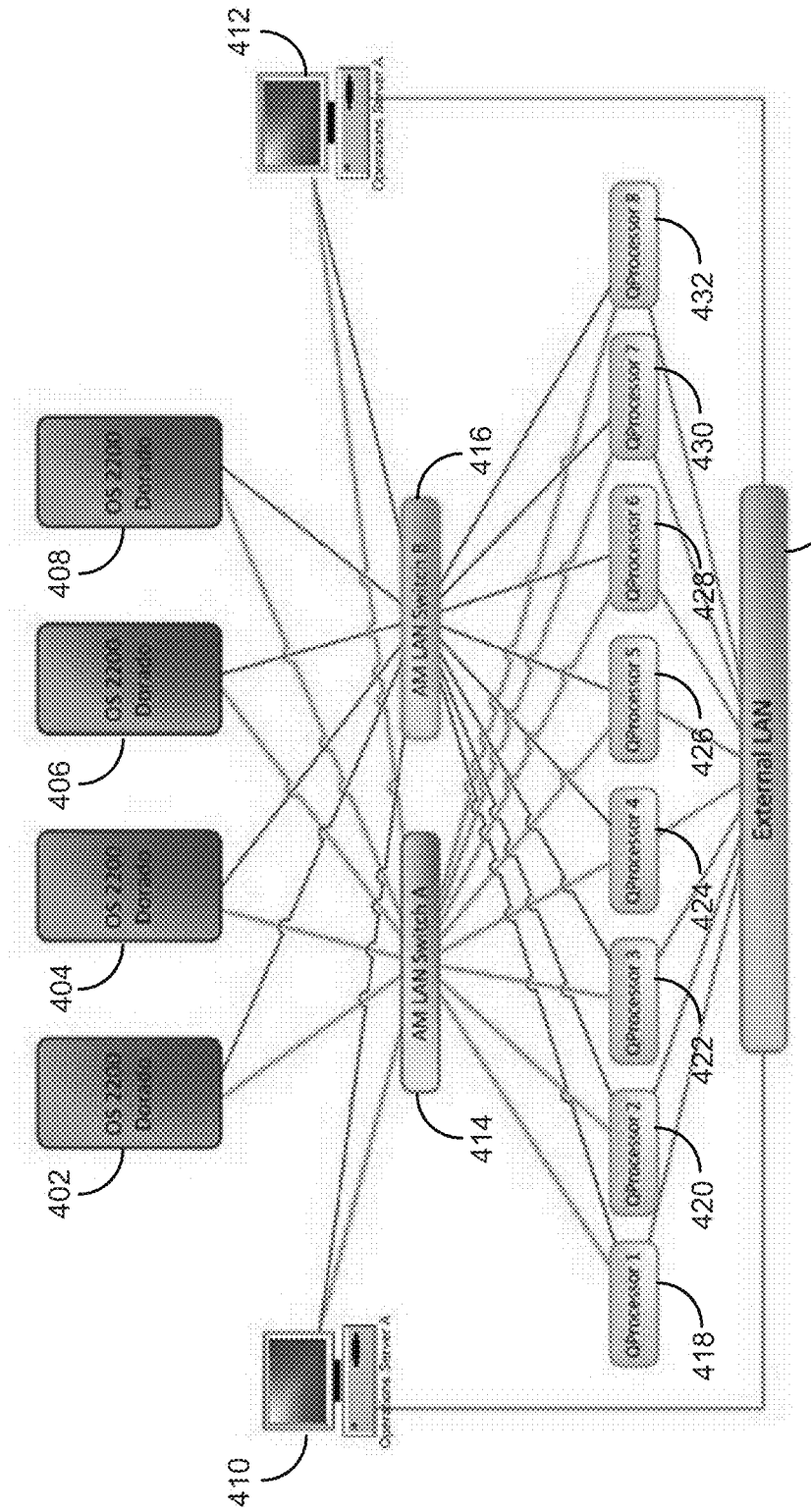
FIG. 4 is a block diagram of an example computing system, according to one example embodiment of the present disclosure.
Figure 5:
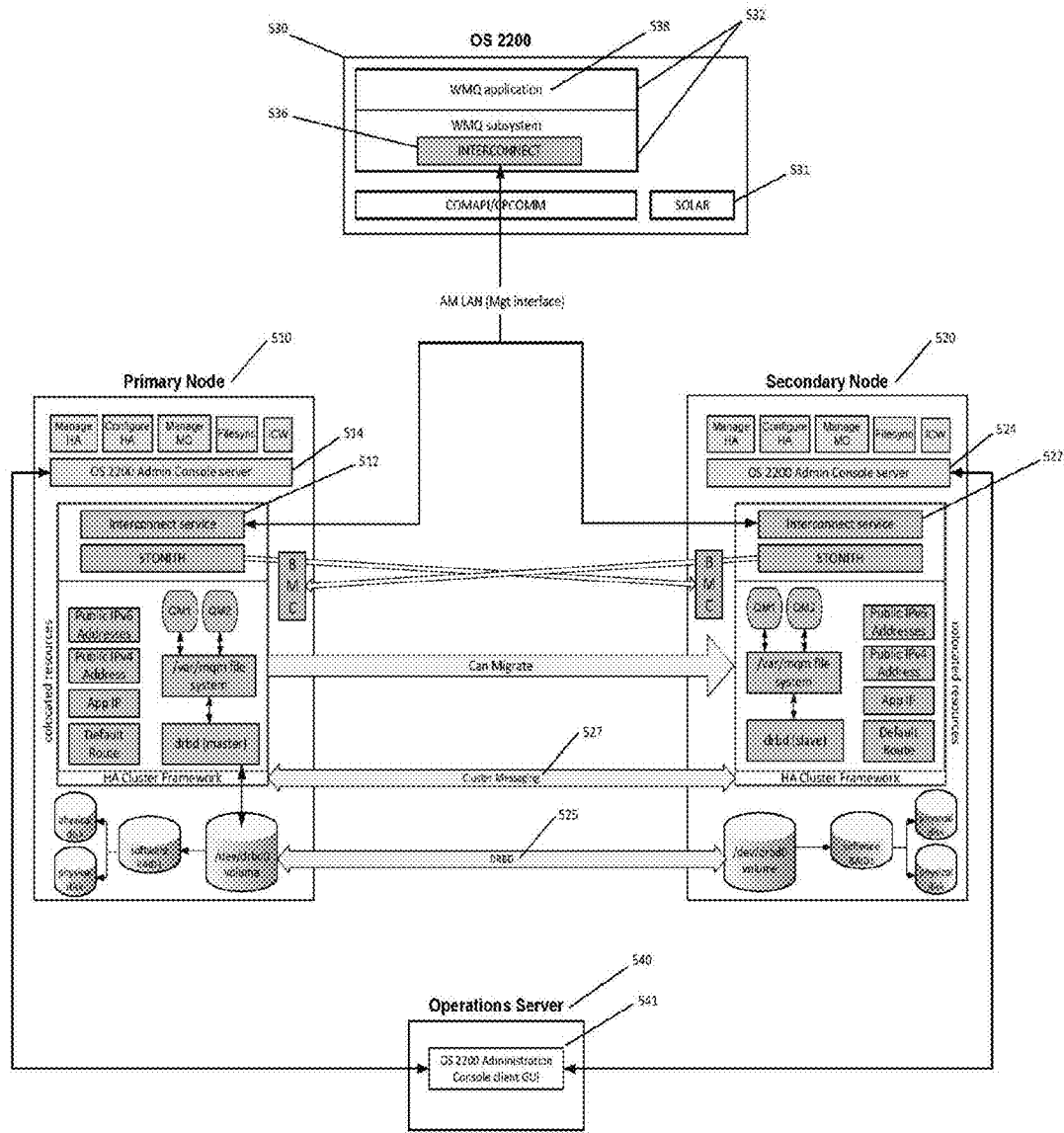
FIG. 5 illustrates an example system, according to one example embodiment of the present disclosure.

In general, the present disclosure relates to high-availability clusters. FIGS. 1 and 2 briefly introduce the concept of clusters, and FIGS. 3-5 provide techniques for setting up, configuring, and managing high-availability clusters.

Referring to FIG. 1, FIG. 1 is a block diagram of an example operational system 100. Preferably, the system 100 includes an operations server 105, a first node 110, and a second node 115. The operations server 105, first node 110, and second node 115 communicate with each other via a communications link 120. Preferably, the first node 105 is a production node 125. The production node 125 is the primary node that substantially all operations run on. Preferably, the second node 115 is a standby node 130. The standby node 130 is a backup node that is able to take over production operations should the production node 125 fail for any reason. The standby node 130 can also be used for non-critical work (e.g. test and development) when it is not serving in the role of the production node.

An example operational system 100 is Mariner 1.7® by Unisys Corporation. The nodes are RD900® nodes that support an OS 2200® environment independent of each other. A Mariner 1.7® system supports a maximum of two nodes and only in a production and standby arrangement. Of course, any number of nodes could be utilized in different systems.

The operations server 105, or Server Management Control (SMC) software running on the operations server 105, manages the first and second nodes 110, 115. If the production node 125 fails, the operations server 105 stops the standby node 130. Access to all disk storage that may be attached to the failed production node 125 is made available to the standby node 130, and the communications configuration from the failed production node 125 is restored on the standby node 130. The operational environment running on the standby node 130 is then rebooted using the disk storage from the failed production node 125 and the standby node 130 is now running identically to the former production environment.

As used herein, a cell is a single hardware component, including its associated firmware. A node is a single cell plus the input/output hardware, networking, etc. components, and their associated firmware that are connected to the cell. This collection of computing resources is under the control of a single instance of an operating system. A system is a collection of computing resources that are identified by a single Manufacturing Control Number (MCN).

Referring to FIG. 2, an example operations system 200 is illustrated. Preferably, the operations system 200 includes a first server rack 205 and a second server rack 210. In one example embodiment, the racks 205, 210 are physically placed no more than 15 meters apart such that serial cables can be used to connect the first rack 205 to the second rack 210 for data transfer between the two.

Preferably, the first rack 205 includes a first cell 215, a first operations server 220, a first System Architecture Interface Layer (SAIL) kernel input/output (I/O) 225, and a first operating system (OS) I/O 230. A first node, e.g. the first node 110 of FIG. 1, could be considered to include the first cell 215, the first SAIL kernel I/O 225, and first OS I/O 230. Likewise, the second rack 210 includes a second cell 235, a second operations server 240, a second SAIL kernel I/O 245, and a second operating system I/O 250. A second node, e.g. the second node 115 of FIG. 1, could be considered to include the second cell 235, the second SAIL kernel I/O 245, and the second operating system I/O 250.

A cell typically includes at least one processor, a memory, a DVD drive, on-board network interfaces, and PCIe slots. The first operations server 220 and the second operations server 240 are redundant. A single operations server could be used to manage both the first node and the second node. The operations server 220, 240 includes the Server Management Control (SMC) software that manages the OS environment and the underlying hardware and firmware (SAIL) platforms, including partitioning, initializing, booting, and maintaining the OS environment.

Preferably, the system 200 also includes a production disk storage 255 and a non-production disk storage 260 managed by the OS 230, 250, respectively. The disk storages 255, 260 are managed by the OS 230, 250 and connect through the storage IOPs (SIOP). SAIL cannot access the OS disks and tapes. The production disk storage 255 is preferably connected to the first rack 205. The non-production disk storage 260 is preferably connected to the second rack 210. In one example embodiment, the production disk storage 255 must be identical to the non-production disk storage 260. That is the number and location of IO expansion modules (JMR rack), the number and location of SIOPs (PCIOP-E), the number of PCI Channel Modules (GE racks), the type, number and location of HBAs, and the peripheral configuration must be identical. During switch-over, the second OS I/O 250 has access to the production disk storage 255, and the first OS I/O 230 has access to the non-production disk storage 260 as is indicated by the dashed lines in FIG. 2.

Preferably, the system 200 also includes a production SAIL kernel disk 265 and a non-production SAIL kernel disk 270. The OS 230, 250 cannot access these disks 265, 270. Instead these disks 265, 270 are accessed by the SAIL Kernel I/O's 225, 245, respectively. In one example embodiment, the communications hardware configuration must be identical for both nodes. That is the disk storage configuration including the style of the host bus adapter, number of controllers, disks, and interface; the number of I/O expansion modules, SIOP cards, and PCI channel modules, the communications hardware; and the number of network interface cards, PCI slots in which the NICS are installed, and the number of ports must be identical. The tape storage configuration should also be identical.

The SAIL kernel disk storage 265, 270 is unique to each node and access to the SAIL kernel disk storage 265, 270 is not switched when the roles of the first and second nodes are switched. In other words, when the standby node takes over for the production node, the standby node does not have access to the SAIL kernel disk 225 that was being used by the production node.

The hardware configuration of either node can include hardware in addition to that required to replicate the production configuration. The additional hardware is used by a node when it is running as a non-production OS host that is doing non-critical interruptible work. The partition definition used when a node is doing non-critical work contains only the hardware environment used while doing non-critical work, such that only critical work is switched over.

Both nodes 205, 210 run as separate and independent operational environments. The SMC manages these environments as a single system. Software controlled performance (SCP) is handled by initially designating the production cell as cell 0 and the MCN from this cell is used to validate image enablers and the SCN on both the production and standby nodes.

The entire communications network (system control LAN and production LAN) is managed by the SAIL kernel. However, generally, the OS network traffic utilizes one or more production LANs, and SAIL network traffic utilizes one or more system control LANs.

The clustering provided by the system in FIG. 2 provides what is known as High Availability (HA). In short, HA encompasses the concept of increased reliability through redundancy, or clustering. As described above, when the rack 205 fails, the rack 210 is automatically activated to take the place of the rack 205—a process known as "failover."

The systems of FIGS. 1 and 2 are advantageous, but could be improved, especially with respect to cluster setup. In the past, as system administrators have attempted to implement clusters, they had to be proficient in several different areas, including the structure of the underlying operating system, the particular file system used on the machine(s) to be clustered, networking protocols/architecture, and the application(s) (including any supporting applications such as databases, web servers, etc.) that are running on the machines. Any one of these subject matter areas is something most systems administrators spend whole careers learning, and it is generally rare to have someone who branches out much beyond one such area.

In addition, in more specialized computing environments like those used associated with IBM's middleware known as WebSphere MQ® (or just "MQ"), the configurations get quite intricate and even subtle changes can result in significant performance hits. Thus, the idea of creating a cluster is not something that is normally relished.

In general, various embodiments described herein define a set of best practices for a particular computing environment, and provide an appliance that simplifies the creation of a cluster in that environment. The appliance has a fairly straightforward user interface that abstracts out many of the complexities of the typical configuration processes, thereby significantly simplifying the deployment process. By using such appliance, system administrators can deploy an almost turn-key cluster and have the confidence of knowing that the cluster is well tuned for the application/environment that it supports. In addition, the present disclosure allows for configurations and integrations of specialty engines, such as Q processors or J processors, into the cluster.

Referring to FIG. 3, FIG. 3 illustrates an example system 300, according to one example embodiment of the present invention, and is illustrative of a typical minimum hardware setup for a system cluster. Preferably, the system includes a first operating system 302, such as an OS 2200 operating system, or MQ module, that connects to and communicate with a first operations server 308, a second operations server 310, a first Q processor 312 (operating in an Linux environment), and a second Q processor 314 through a first switch 316 and a second switch 318. The first and second operations servers 308, 310 and the first and second Q processors 312, 314 can also be connected to an external LAN 320. Through the use of multiple components, redundancy and/or clustering are achieved. Other components could also be utilized or replaced. For example, a Q processor is a computing system designed to run Linux. Other computing systems could be used as an alternative, such as a J processor (Java system).

Referring To FIG. 4, FIG. 4 illustrates an example system 400, according to one example embodiment of the present invention, and is illustrative of a typical maximum hardware setup for a system cluster. Here, the system 400 includes a first operating system 402, a second operating system 404, a third operating system 406, and a fourth operation system 408. Each of the operating systems 402-408 can be an OS 2200 environment. These operating systems 402-408 are connected to and communicate with a first operations server 410 and a second operations server 412 through a first switch 414, and a second switch 416. The operating systems 402-408 also connect to and communicate with a first through eighth Q processors 418-432 through the first switch 414 and second switch 416. The Q processors 418-432 can also be connected to an external LAN 434.

Referring to FIG. 5, FIG. 5 illustrates an example system 500 according to one embodiment that builds on the cluster configurations described above with respect to FIGS. 3 and 4. Preferably, the system 500 includes two nodes 510, 520, or Q processors, and a MQ module 530 that operates under OS 2200. The node 510 is an active node, and the node 520 is a passive node. As explained in further detail below, when node 510 fails, the system 500 detects the failure and switches the resources to system 520 if the resources cannot be restarted on system 510.

The operations server 540 is connected to the AMLAN and to the nodes and the MQ module 530 therethrough. The operations server 540 runs the admin console GUI 541. The admin console GUI connects to the Administration Console Server 514 or 524 to manage the cluster. Preferably, inside the Administration Console 514 and 524 are various modules (Manage HA, Configure HA, Manage MQ, File Sync and ICW). The operations server 540 communicates with the nodes 510 and 520 using TCP/IP protocol. The Interconnect 536 is specially designed to allow MQ-user written applications running on the MQ module to access the Queue Managers and data running on the nodes 510 and 520. The Interconnect facilitates the offloading of OS 2200 functionality onto Linux programs and visa versa. The Interconnect can be also be used to integrate new, Linux-based functionality into the OS 2200 system. The MQ deamon 532 runs in the MQ module 530. SOLAR 531 also resides on the MQ module 530 and uses the Interconnect 536 to get software to the nodes 510 and 520.

Figure 6:
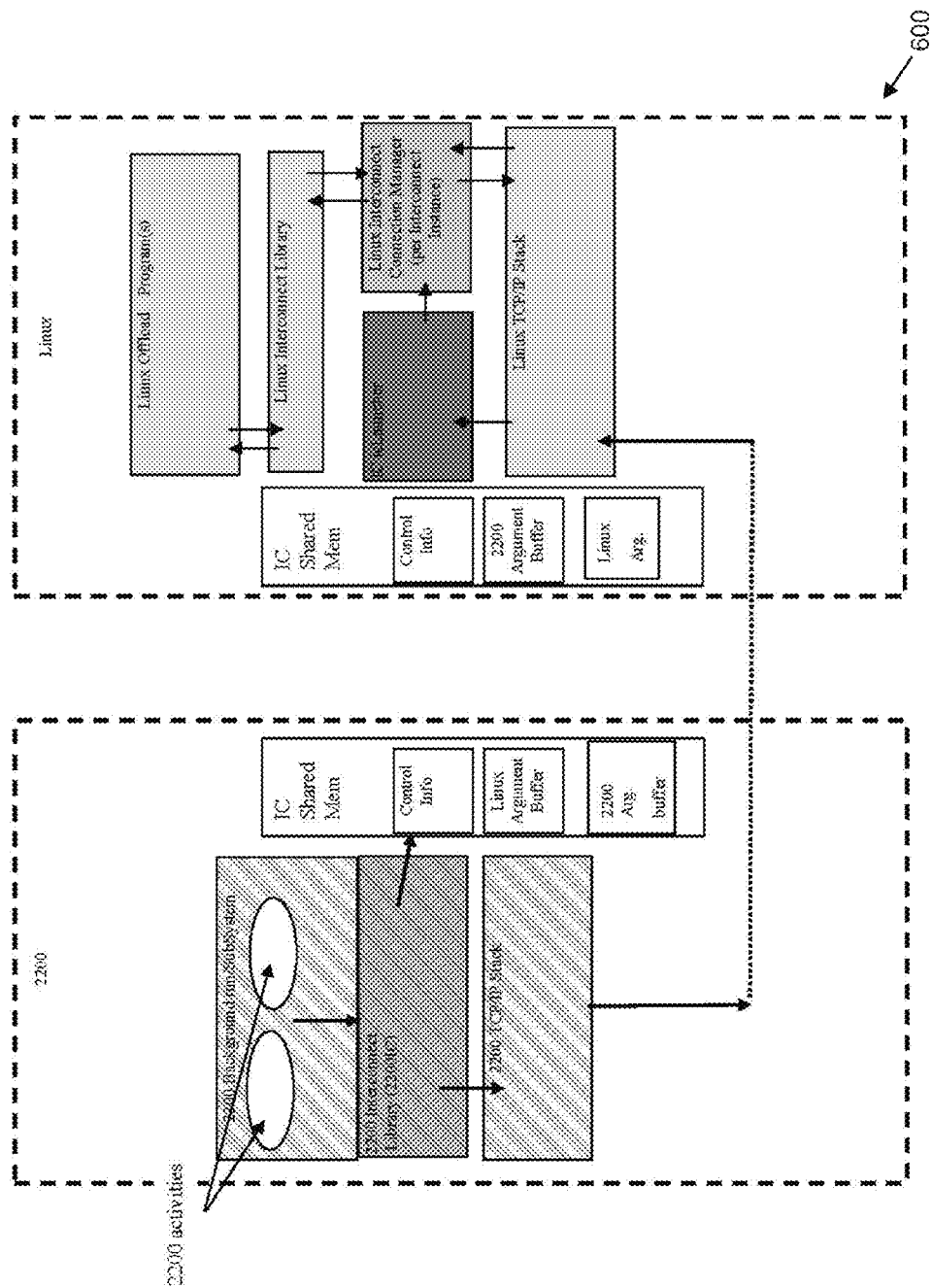
FIG. 6 illustrates an example Interconnect architecture, according to one example embodiment of the present disclosure.

The Interconnect enables 2200 programs to interact with Linux programs that house various offloaded 2200 functions. It provides a general purpose request and response paradigm for one program (either 2200 or Linux) to request its partner program to perform some function, and then get an answer back. The functions performed are defined by the programs and are independent of the Interconnect. FIG. 6 illustrates an example Interconnect architecture 600.

Example uses of the Interconnect are the JVM and MQ. For example, JVM uses the Interconnect for these transitions:

Starting the JVM.
Call/return from Java to 2200 C library via JNI.
Call/return from 2200 C library to Java via JNI.

An Interconnect library is introduced to hide the details of passing requests and responses between the 2200 and Linux programs. The Interconnect library interfaces use standard C function calls. There are two parts of the library, one for the 2200 side and one for the Linux side. The Interconnect library is full-duplex, allowing multiple concurrent requests and responses in both directions. The Interconnect library includes helper functions to perform administrative tasks such as setting and getting debug levels, getting instance-ids, pids and versions.

On Linux, there exists the IC icLauncher, which is run as a daemon. It must be started independently of the 2200 and Linux programs. There may be one or more IC icLaunchers on a particular Linux system. Each icLauncher will "listen" to a configured IP/Port waiting for the 2200 to connect. When a connection request is received, the IC icLauncher will fork an independent process called the IC Connection Manager which is tied to a particular interconnect instance on the 2200. Each IC Connection Manager includes optional offload processes which become containers for each 2200 affinitized session. On the 2200, the interconnect instance may be shared among activities in a subsystem as envisioned in the case of MQ. Each activity of the subsystem will affinitize an IC session using the same IC shared memory segment created when an ic_create_interconnect was issued.

The Interconnect provides a secure shell to issue Linux commands from the OS 2200 system while sandboxing the requests to only a few protected file systems. Users on the OS 2200 transparently issue QProcessor commands using the Interconnect in a secure and seamless way. The OS 2200 user ids are mapped to QProcessor user ids and then commands are executed as if they are signed into the QProcessor system. The QProcessor offload programs are started with specific security privileges. The OS 2200 credentials are passed to the QProcessor side and mapped to QProcessor credentials before the QProcessor offload program executes. When the OS 2200 program calls affinitize connect to the QProcessor, the 2200 credentials are passed and mapped to QProcessor credentials so that the selected offload worker can inherit the named credentials. The Interconnect QProcessor icLauncher allows the user to specify the local listening address to ensure only messages destined for this program are received. All related processes and shared resources on the QProcessor side are terminated automatically in the event of an OS 2200 failure. All system error messages generated on the QProcessor are sent to the Operations Server, which collects messages from all different systems in the Unisys network.

An individual TCP-IP connection is established for each MQ connection request to the QProcessor. These connects are pooled and managed by the Interconnect. Thread affinity is maintained. The Interconnect allows OS 2200 programs to call functions that are physically located on the QProcessor. The remote functions are executed and results are returned to the OS 2200 program. Data translation from the OS 2200 36 bit word to the QProcessor's 64 bit words is done transparently and efficiently. The data is formatted in OS 2200 C Call stack format for ease of transfer. Embedded remote function calls are supported. An OS 2200 program can call a QProcessor function which in turn calls another OS 2200 function.

Remote function description is pre-defined into a header file using Interconnect structures that define the data type and it's supported direction (input only, output only or in/out). These structures are passed into Interconnect defined function calls and interpreted at run-time. Data types allowed to be passed from OS 2200 to Linux include, without limitation: integers and unsigned character data/arrays; integer, unsigned short, long (may be arrays) and unsigned character arrays, optionally passed as a fixed length array, floats, doubles and pointers.

The Interconnect interface allows for configuring properties of the spawned QProcessor processes in terms of how many, high and low water marks for maintaining a pool of QProcessor processes, debug levels and wait times for connections. The Interconnect monitors the connection between the two systems and aborts the session if loss of connectivity is detected. Statistics of the QProcessor offload processes can be gained by the Interconnect. The Interconnect enables QProcessor RPMs to be installed from the OS 2200 system using standard OS 2200 installation software. The Interconnect icadmin program allows OS 2200 users to view processes that are running on the QProcessor and see what their status is as well as configure connectivity parameters. The Interconnect icmount command allows OS 2200 users to mount shares.

The MQ module 530 runs in an environment similar to that of the nodes 510, 520. In this example, the environment includes OS 2200, a proprietary operating system available from Unisys Corporation, though other embodiments may use a different operating system. The Administration Consoles 514 and 524 operate in a Linux environment and provide for setup, monitoring, and operation of clustering functionality. The Administration Consoles 514 and 524 also include a Graphical User Interface 541 (GUI) that provides an easy way for a system administrator to setup and manage clustering. While Linux is given as an example, the scope of embodiments is not so limited, as other embodiments may use other operating systems for the Administration Console 514 and 524.

As will be explained in more detail below, the GUI provided by the Administration Console 514 and 524 hides the Linux operations from the user for convenience. In one example, the user of the GUI interacts though a simple set of fixed options, and in response to user input, the Administration Consoles 514 and 524 run scripts to perform various actions, thereby taking burden off of the user.

The typical target user for the operations server 540 is an experienced OS 2200 administrator, who may have little or no Linux experience. Likewise, the admin console GUI 541 is easy to use, intuitive and easily navigated and understood by someone unfamiliar with Linux. Linux specific terms, names of Linux binaries, references to Linux permissions, etc. are hidden from the user by this example embodiment whenever possible. In cases where advanced functionality requires some Linux terminology, such functionality may be shielded from the rest of the admin console functionality in an "Advanced" tab or other container and used for optional parameters.

The system 500 is shown in this example as having two different nodes, though the scope of embodiments is not so limited. Various embodiments may include two or more active nodes in addition to two or more passive nodes.

The Administration Consoles 514 and 524 enable HA clustering of the nodes 510, 520. System 500 employs software to establish the cluster, which monitors and provides a highly available set of MQ resources in MQ daemon 532 and the requisite dependencies and constraints for proper functioning. Using a simple, graphical module within the Administration Console 514 and 524, a user can add predefined MQ queue managers, brokers, triggers, channels and listeners to the resource list. An OCF (explained in more detail below) monitors each individual component for health and can subsequently restart or failover resources to maintain application uptime.

The health check intervals, timeout values and failure actions can be adjusted and tuned for each queue manager and component, although optimized default values are included. In addition, the cluster framework 527 monitors the health of the network, DRBD (if enabled), MQ file system(s), STONITH devices and the Interconnect listener takes action as necessary to maintain uptime (where such functions are explained in more detail below). Likewise, these supporting resources can also be tuned to change the monitoring interval, timeout and failure actions.

Certain terminology is explained below, though the embodiments shown are exemplary, and the scope of embodiments is not limited thereto.

Heartbeat—High Availability clustering software. Supports the creation of a cluster and includes support for a wide range of applications and services. Custom resource agents can be written to extend Heartbeat to support almost any application.

Node—Refers to a server that is part of a HA cluster.

Cluster—two or more nodes running Heartbeat or Pacemaker software that are joined together to form a logical group. By abstracting two or more standalone systems into a single platform the cluster can tolerate the loss of an entire node by moving resources to the healthy node with minimal disruption of service.

Pacemaker—HA clustering software used in addition to Heartbeat. Pacemaker itself no longer includes the cluster messaging layer and instead relies on Corosync, OpenAIS or Heartbeat to manage the intra-node communication. Pacemaker is under active development and used worldwide in many datacenters.

Resource—An application, service, I/O interface or operating system object that is made highly available through clustering. Examples include DRBD volumes, IP addresses, file systems, Apache server, Samba server, etc.

Resource Agent—A script which acts as a proxy to control a resource; the primary interface by which Pacemaker manipulates resources. Pacemaker supports both init scripts (LSB scripts) and a more advanced OCF format. LSB scripts can be extended to function as both init and OCF scripts.

Failover—In some failure cases the cluster will move or "migrate" a resource from the primary (or active) node to the secondary (or passive) node. A user may also force a failover in order to free up a node for scheduled maintenance.

Active/Passive Cluster—a two-node cluster where the workload runs entirely on a single node, the active node, at any point in time. The passive node is not currently running MQ and serves as a hot standby ready to accept resources in the event that the active node fails.

DRBD—Distributed Replicated Block Device. Software that mirrors one or more local block devices (disks) to a remote system via Ethernet. Often used as a low cost alternative to external SAN storage at the expense of reduced performance.

Master Slave resource—Some clusters have multiple states and are not simply "running" on a node. These resources, such as DRBD, are configured as master-slave resources in Pacemaker/Heartbeat. These resources have four active states—master, slave, running and stopped. For DRBD, the master side of the cluster has write access to the disk volume.

OCF—A shell script written to a specification that provides a generic front-end for the Pacemaker/Heartbeat HA software to control and monitor that resource. Similar to an LSB init script, an OCF script must support starting and stopping the resource as well as monitoring the resource. This is the primary interface between the actual resource (i.e. —a queue manager) and the Pacemaker clustering framework.

BMC—Baseboard Management Controller. An Ethernet connected hardware device integrated into many modern servers that provides power control (power on, power off, reset) and other management functionality agnostic to the operating system via the Intelligent Platform Management Interface (IPMI) standard. An administrator can remotely restart a server even if the operating system is unresponsive and likewise the Pacemaker cluster framework can restart or power down or restart a node to ensure that it no longer has control of an MQ data volume. This controlled power down or restart of a cluster node is known as STONITH (explained below).

STONITH—Acronym for "Shoot The Other Node In the Head"—a method of fencing nodes that are unstable or have unknown status by forcibly restarting or powering them down. In one example, Pacemaker uses the BMC on the Intel SR1500 as the preferred STONITH device, but other STONITH devices can be used for different platforms.

The following is a non-exclusive list of features of the system 500:

1. Supports at least a two node cluster in active/passive mode. Other examples may support at least two pairs of active/passive nodes per partition with the second pair available for testing.
2. Provides the ability to install MQ or minor updates via rolling updates through the passive node to minimize or completely eliminate downtime attributed to maintenance.
3. Provides high availability against hardware component failures.
4. Provides high available networking by protecting against failures related to the public LAN, the internal application LAN, the network switches, network cabling and the local route configuration.
5. Provides flexible customer LAN support by supporting up to 16 (Linux kernel limit) highly available IPv6 network addresses on the public interface including support for DHCPv6 and static IPv6 addresses and support for mixed IPv6/IPv4 mode.
6. Provides high availability against Interconnect listener failures.
7. Provides highly available MQ file systems by protecting against general file system failures, whether we employ internal or external storage.
8. Provides protection against MQ data corruption by using STONITH to enforce single node data access to common storage.
9. Provides high availability against catastrophic queue manager failures.
10. Provides the administration console module 500 to configure the HA cluster hiding most of the behind the scene details.

The following are features of the example admin console 534 to configure the cluster provided in a non-exclusive list:
1. The cluster setup procedure is simplified and automated.
2. The resources are monitored as a fixed, defined list.
3. The user may only add user-defined queue managers to the list of HA resources.
4. Resources outside the defined list are not allowed to be added as HA resources.
5. The user can optionally use external storage or internal replicated storage as the MQ data store, providing both a low cost and a high performance option.
6. Internal disk configuration with DRBD is fixed and not configurable on site.

Furthermore, features of the Administration Console 514 and 524 relating to managing the cluster are listed non-exclusively below:
1. Node Functions: Online, Standby (node running but no resources are running on it), Offline (node not under cluster control), Add replacement node for one that is offline.
2. Root Controlled Resources: network (IP Addresses for public and Application interfaces and Routes), File systems (/var/mqm and /var/mqm/log), LVM; Interconnect running on both nodes of the cluster, STONITH—program to automatically fence and restart node, runs on both nodes, Optional DRBD, runs on both nodes with one deemed as the "master", User defined queue manager, queue manager objects. The Administration Console 514 and 524 has three admin views or sign-ins: "Root", "MQAdmin" and "QAdmin". Each admin view has a different set of functions.
3. MQAdmin Controlled Resources include User defined queue managers and queue manager objects.
4. The QAdmin user id can only view the cluster status, and is not allowed to manage it.

5. Each resource is dependent on the location of the file system with the exception of the Interconnect and STONITH which run on both nodes. Each resource is monitored to ensure it is operational. If it is deemed "not running", the cluster will attempt to restart it. If a resource cannot be restarted, the configured "on-fail" action in performed. On-Fail actions include keeping the resource stopped, taking the resource out of cluster control, or fencing the resource and all its dependencies which usually results in the resources going down and restarting on the other node.
6. Root controls Node Functions and Root Controlled Resources stated above. Resources can be viewed, started and stopped. Timeout values can be set for all resources, on-fail actions will default to "fence". This includes how long to wait for a start or stop directive to complete.
7. MQAdmin only controls queue manager resources. These can be started, stopped and the HA cluster status viewed. Timeout values and "on-fail" actions can be set.
8. Node can go to standby for maintenance. This includes applying bug fixes to MQ or image supplied software.
9. Status of node and each resource clearly visible.
10. Help with cleaning resources in case of error.
11. Debug and support tools.

The loss of persistent messages is minimized or eliminated due to an event that causes the active workload to failover to the other node of the cluster. The OS 2200 MQ daemon 532 is connected to one and only one node 510, 520 of the cluster at one time. The MQ daemon 532 monitors for a lost connection and then automatically attempts to reconnect. If HA clustering is in effect, Heartbeat will automatically move the necessary IP Addresses to the active node of the cluster to ensure availability.

The OS 2200 Application programs are cluster-aware to ensure high availability. When an application detects a disconnect, it attempts to reconnect to MQ multiple times until communications are re-established. Then it can continue to get/put messages.

Some embodiments provide comparable cluster architecture for VMware Virtual Machines to allow for widespread Engineering testing while minimizing hardware acquisition costs. This feature may be used for internal engineering use.

Failover time between nodes of the cluster is minimized. Various embodiments allow migration of MQ data when originally stored on the internal disks to be moved to external storage. Various embodiments also allow migration of MQ data when a node 510, 520 is converted from a non-HA setup to one using HA. The time to perform this migration depends on the amount of data, the disc copy time plus a few minutes administrative time.

Some embodiments allow the user to add channels, listeners, command servers, triggers and possibly MQ broker objects as HA resources. Such feature can be included in the Administration Console 514 and 524 and, more specifically, in the one or more GUIs provided by the Administration Console 514 and 524.

Some embodiments use Pacemaker 1.0.6 as the cluster framework software and Heartbeat 3.0.2 as the cluster messaging layer, though the scope of embodiments is not so limited.

Pacemaker allows for defining cluster resources including network IPs, file systems, services and queue managers to be automatically monitored for good health. For MQ queue managers and brokers, triggers, channels and listeners are using custom provided monitor logic in the form of a MQ OCF. When the primary node detects an unrecoverable failure, the secondary node takes over its IPs, file systems, services and queues so work can continue.

Clustering is designed to recover from single faults and to add one "9" to availability. It ensures that unplanned outages are short—from seconds to only a few minutes—and automatically recoverable. Without HA clustering, human intervention is required to restore functionality.

The nodes of the cluster communicate using the management IP address over the internal LAN. This address should be available on both nodes of the cluster.

During cluster configuration, several resources are defined that are important to operations. Resource Agents are generally known as existing service or programs that are elected in Heartbeat to be monitored. The nodes 510, 520 employ four types of resources agents:

OCF
LSB
Clones
DRBD

An OCF (Open Clustering Framework) Resource Agent has a script that conforms to the OCF standard for monitoring, starting and stopping a particular resource. Heartbeat calls these basic actions and expects certain return codes depending on the state of the resource. When configuring an OCF, the administrator may pass defined parameters to the script as name-value pairs. For instance, the resource used to monitor to network is configured to pass in the IP address. In the present example, OCFs are used to monitor queue managers, IP addresses, routes, file systems and LVM resources.

A LSB resource agent is usually a service that is controlled via an initd script. It implements certain functions so the cluster framework, Pacemaker, can start, stop and monitor it.

A Clone resource runs on both nodes 510, 520 of the cluster at the same time. The Interconnect services 512, 522 are defined as cloned resources. The Interconnect 522 runs on the node 520 to support updates to MQ software which is applied from the OS 2200 SOLAR product 531.

DRBD is a special resource agent which is implemented as a Master/Slave resource. This allows DRBD to be up on both sides of the cluster and promoted to "Master" status on the active node. The DRBD software is equipped with its own OCF for integration with the Pacemaker cluster framework.

The ClearPath OS 2200 QProcessor has several files kept in sync across the two nodes of the cluster including the Interconnect usermap file, system files /etc/group, /etc/password, /etc/shadow, /etc/sysconfig/SuSEfirewall2 and backup profiles used by the Administration Console 514 or 524. Also included is a front-end for rsync called "filesync". Filesync is manipulated by a system service of the same name so that it can easily be enabled, disabled, stopped, started and restarted as necessary.

Table 1 shows the resource agents defined in the nodes 510, 520. Queue managers are added independently and are controlled by OCF.

TABLE 1

| Resource Agent Name | Group Name | Type | Description |
|---|---|---|---|
| Drbd | Replication | Master/Slave OCF | This resource handles the monitoring of the DRBD resource itself. This resource is only available when a QProcessor does not use external storage |
| appIP | Network | OCF | This resource controls the IP with the 2200. It is required. |

TABLE 1-continued

| Resource Agent Name | Group Name | Type | Description |
|---|---|---|---|
| pubIP | Network | OCF | This resource controls the default IPV4 public IP. This resource is optional. The user may also add additional IPv6 public interfaces. |
| Route | Network | OCF | This resource is the default IPV4 route. It is required if pubIP is defined. Users may add additional IPV6 routes. |
| Interconnect | Interconnect | Clone | Must be available on both nodes of the cluster. This resource contains two sub-resources to control each node. They are named Interconnect: 0 and Interconnect: 1. |
| var_mqm | MQ Filesystems | OCF | This is the MQ file system for var/mqm. Network and QM resources are dependent on this. This resource is required. |
| var_mqm_log | MQ Filesystems | OCF | This resource is only present with external storage systems. |
| mq_lvm | MQ Filesystems | OCF | This is the LVM resource to allow snapshotting of /var/mqm so backups can be run while QMs are up. This is a required resource. |
| mqlog_lvm | MQ Filesystems | OCF | This is the LVM resource associated with /var/mqm/log. It is required for external storage. |
| STONITH | Node Reset | External/IPMI | For fencing and automatic failover. Runs on both nodes of the cluster. |

Heartbeat monitors each configured resource by calling its associated monitor routine. If the resource returns a status other than "running", Heartbeat attempts to restart the resource. If the resource cannot be restarted then it follows the configured "on_fail" action.

Fencing attempts to isolate the errant node of the cluster. Node 520 uses STONITH (Shoot the Other Node in the Head) 521 or essentially a reboot to do this. In the present example, the resources are tied together so switching one bad resource alone is not really an option. If STONITH 521 is used, the resources will switch over to the node 520, and node 520 becomes the "Master" and the node 510 is available for standby. STONITH 521 is useful to clear some networking issues.

The example system 500 includes the DRBD package 525. Disabled by default, DRBD 525 is optionally and automatically configured and enabled by the Configure HA module to provide highly available, mirrored storage when external SAN storage is unavailable or unnecessary. The DRBD 525 implementation is designed to integrate seamlessly with the Administration Console 514 and 524 software, LVM, the /var/mqm file system.

DRBD 525 uses a kernel mode driver that sits between the file system and the physical disk device drivers to mirror an entire disk device between two or more remote systems using TCP/IP. DRBD 525 can be thought of as a network RAID1. DRBD 525 supports both asynchronous, memory synchronous and fully synchronous updates and by default only the latter is enabled for system deployments. At any point in time only system can access the DRBD 525 device, greatly minimizing unintentional data corruption as the secondary node is prevented from mounting any file system hosted on a DRBD 525 device.

DRBD 525 efficiently manages I/O to minimize performance loss due to network latency. Only changed blocks are sent to the secondary node instead of entire files, disk reads take place only on the local node resulting in near native performance for read operations and blocks changed multiple times in successive operations are only synchronized once.

Included as part of the SLES 10 operating system is a sophisticated partition abstraction tool called the Logical Volume Manager (LVM). While LVM has many features, our focus is on the LVM snapshot feature which allows for real time creation and deletion of copy-on-write (COW) snapshots.

LVM COW snapshots are used to create a fixed point in time view of a data source. Disk space is efficiently utilized because the snapshot only consumes free space as the original source data changes. LVM uses the source data and the snapshot pool of changed blocks to present a view of the data that duplicates the exact state of the data when the snapshot was taken.

LVM snapshots are useful because they allow databases and mission critical data to be backed up with minimal disruption to the application. For MQ, the application is shut down to quiesce the data, but can then immediately start once the snapshot has been generated. And since the snapshot creation time takes a fraction of a second, the application is down only for as long as it takes to restart it.

Figure 8:
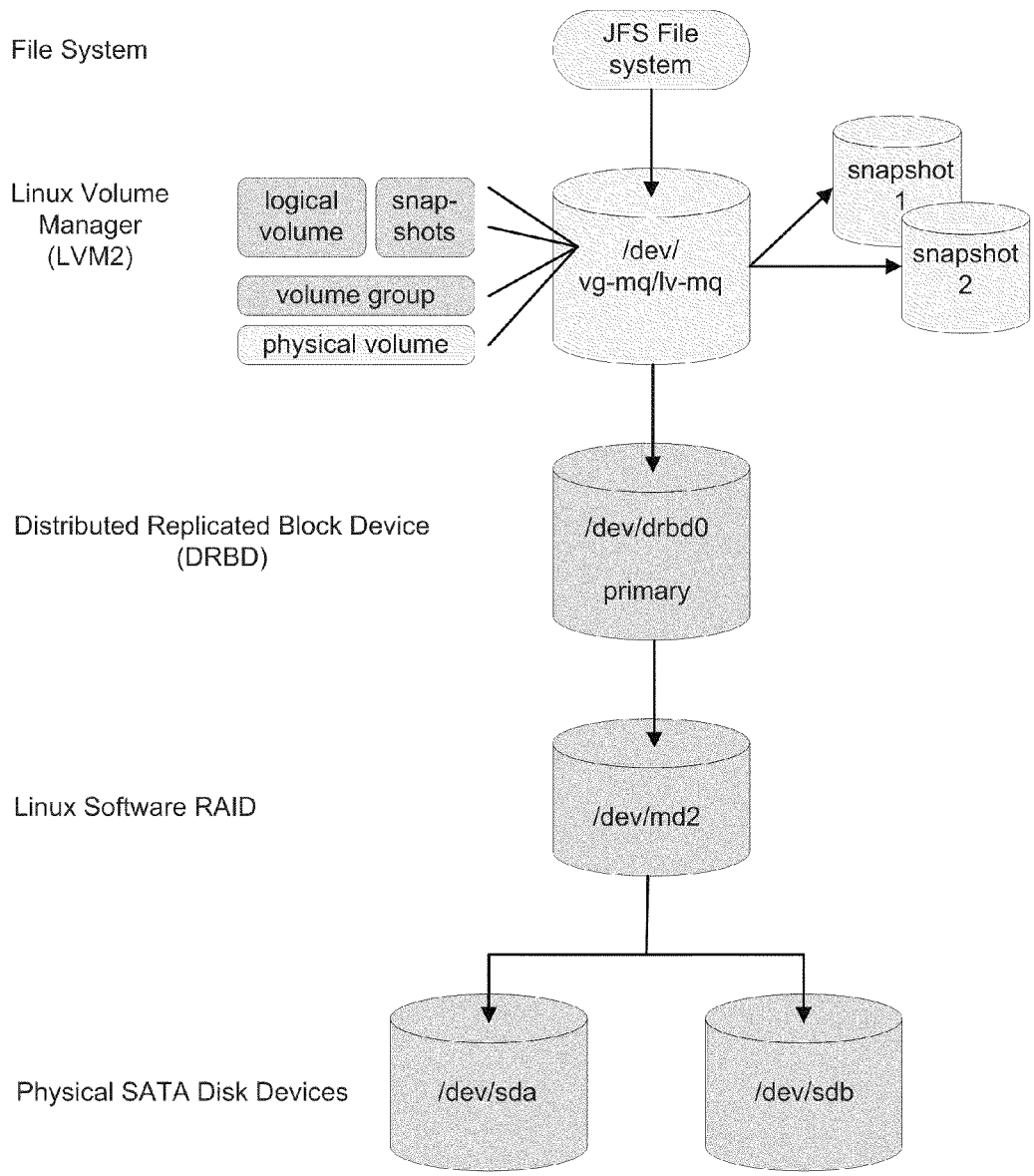
FIG. 8 illustrates where the LVM fits into the disk layout of the system, according to one example embodiment of the present disclosure.
Figure 9:
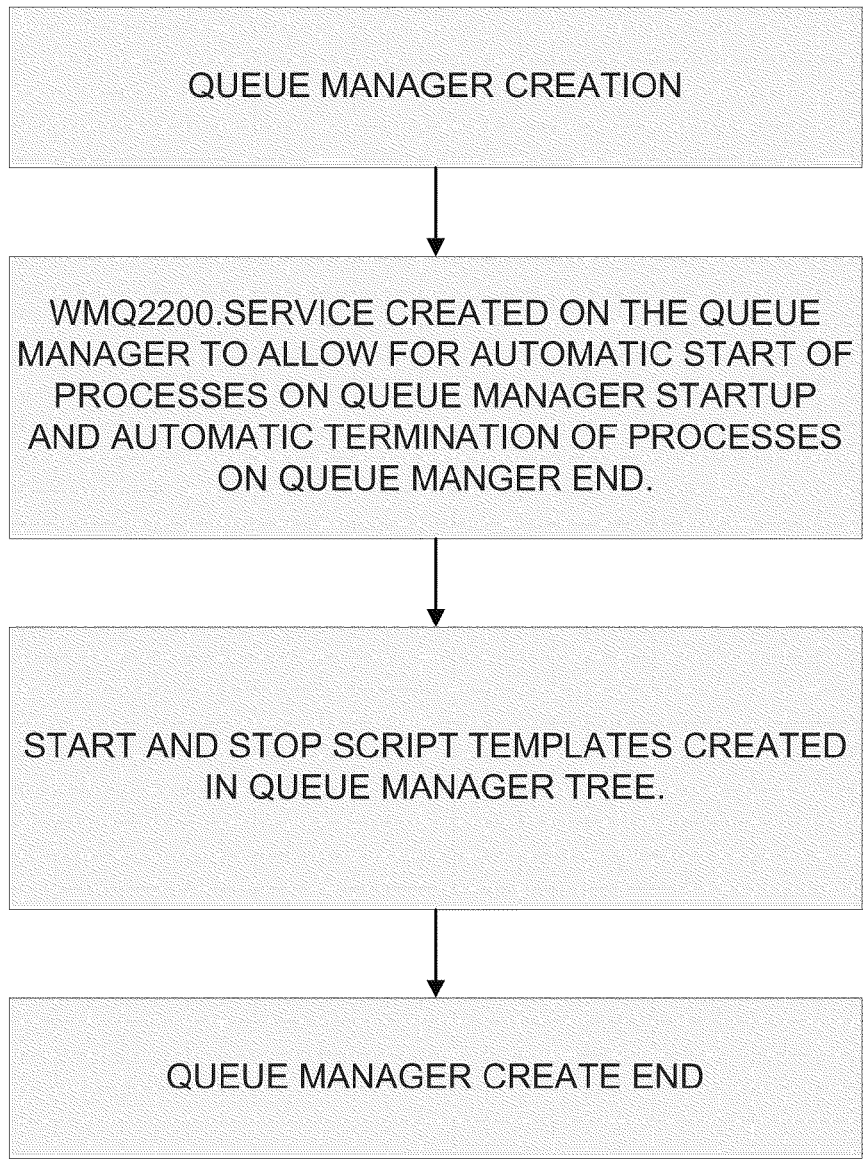
FIG. 9 illustrates a script template, according to one example embodiment of the present disclosure.
Figure 10:
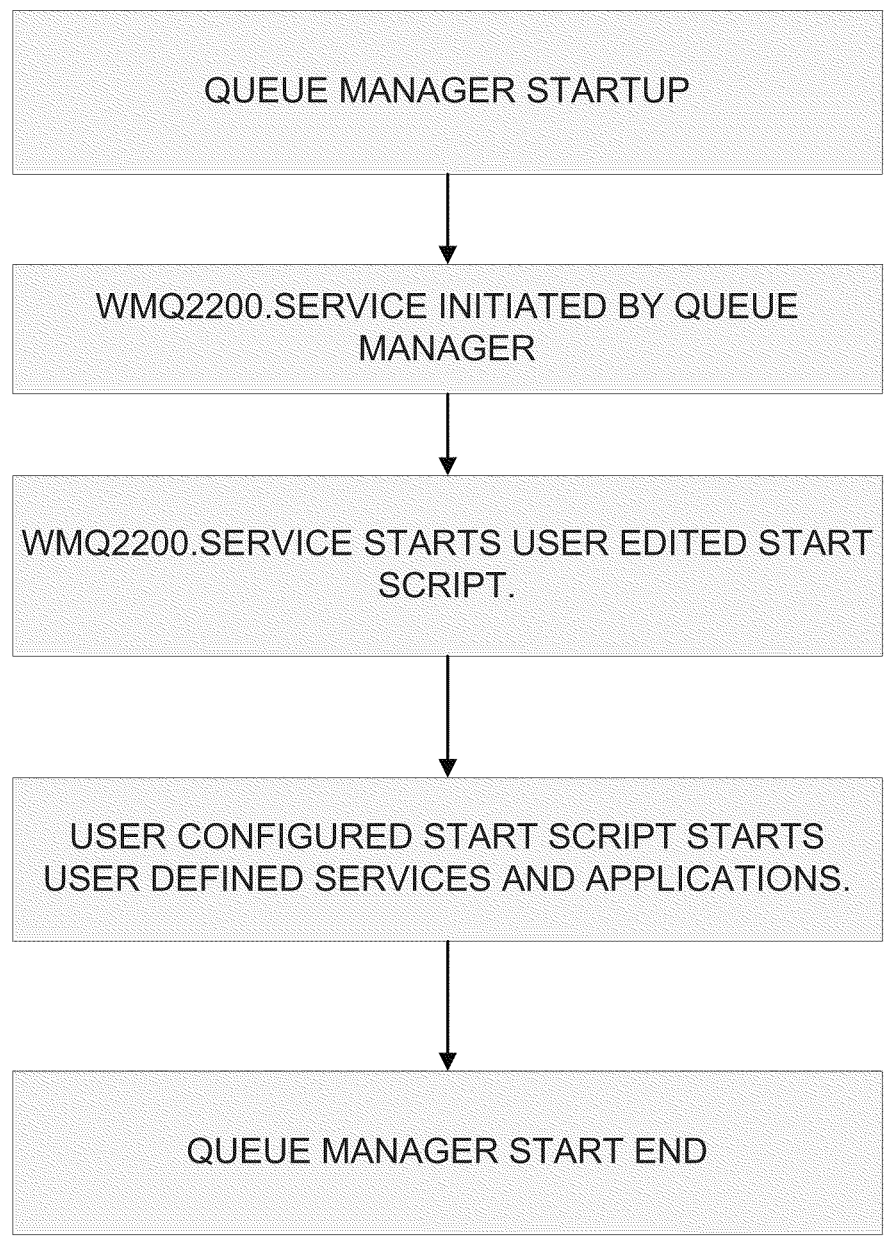
FIG. 10 illustrates another script template, according to one example embodiment of the present disclosure.
Figure 11:
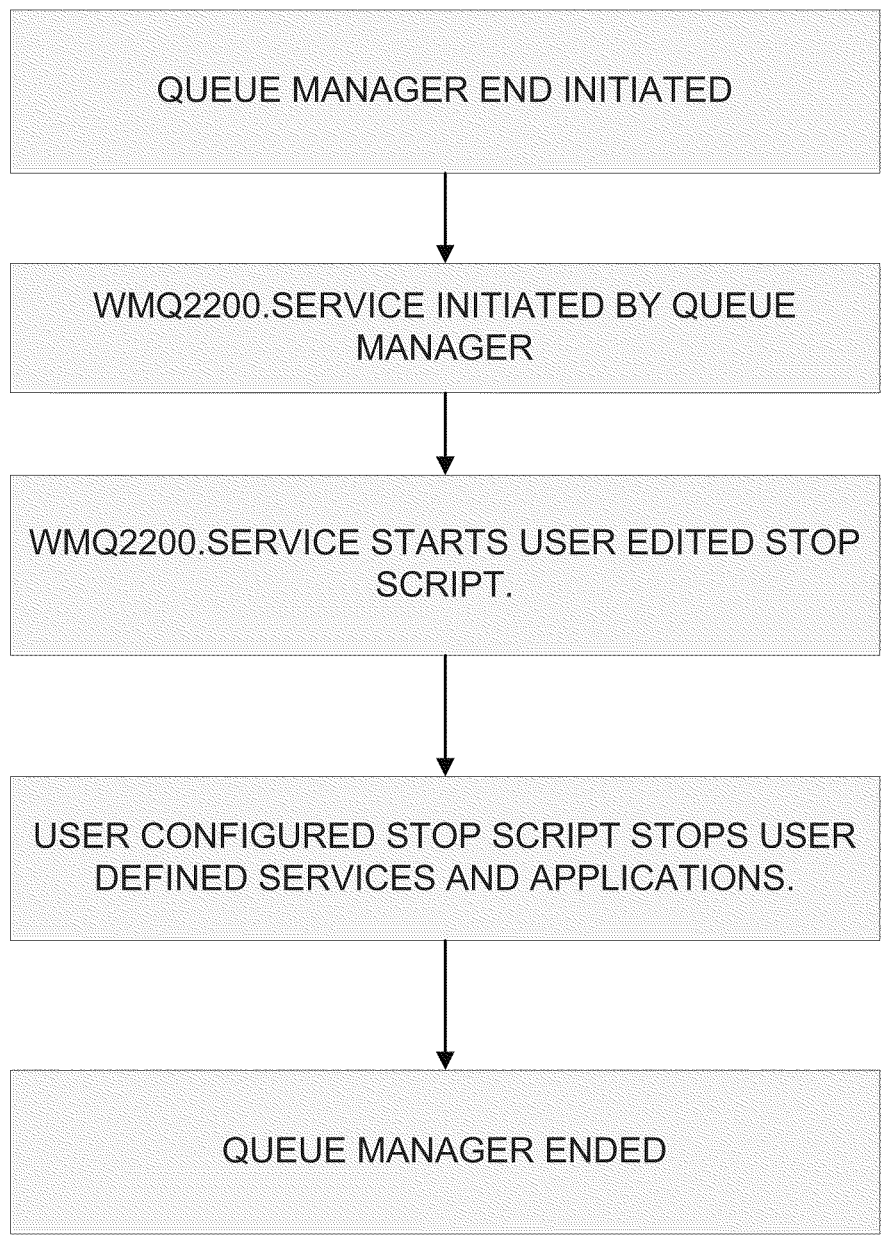
FIG. 11 illustrates another script template, according to one example embodiment of the present disclosure.

To simplify procedures for the end user, a manage MQ module within the Administration Console 514 or 524 provides the functionality already provided by the "backup queue manager" action. The manage MQ module un-manages the associated cluster resource, stops the queue manager, generates the LVM snapshot, starts the queue manager and then begins the backup process targeting the snapshot volume. At backup completion, the snapshot is removed and the original cluster state is reinstated. FIG. 8 shows where the LVM fits into the disk layout 800 of the system 500, according to one embodiment. In addition, alternative or external storage could be utilized.

Support of high availability for the system 500 includes several changes to the conventional MQ software. The following changes are made:

1. Strmqm and endmqm are modified to check to see if node is in the cluster. These functions are to be enabled for a node in the cluster. They are performed from the "Manage HA" modules.
2. New shell command is available for querying the description of a queue manager. This feature supports the "Configure HA" module.
3. Adjustments may be made for made for UNX (for remote administration) commands to the passive node, where such commands may not otherwise be supported on a passive node due to the lack of the /var/mqm file system.
4. The support of start and stop scripts is enabled for strmqm and endmqm. These support the cluster to restart the queue manager and all of its pieces.
5. Installation of WMQ from SOLAR has been changed to support installation to both the active and passive nodes to enable HA of the MQ workload.
6. Updates to the WMQ daemon to retry a failed connection are included.

7. A supporting program, tool or script to start, stop and monitor MQ objects including triggers, channels, command server, listeners and brokers, is added.
8. Support is added for migration to external disks if internal disks are used and populated. This will be added to the Configure External MQ submodule, part of the Configure External Storage module.
9. The MQ commands, strmqm and endmqm, are cluster aware.

The following examples present four different scenarios. The first scenario gives an example process to set up a cluster from scratch out of the box.

In this scenario the customer has placed an initial order for two servers (e.g., nodes 510, 520 of FIG. 5) that are planned to be clustered. From the factory, the first server is shipped and setup with designation 1, the second server is shipped as a spare and does not have a designation.

After physically connecting both systems and switches into a third system management server, the Field Engineer (FE) logs into the Administration Console 514 for the primary server 510 and runs the Initial Configuration Wizard (ICW). In the ICW, the FE configures the public LAN, optionally changes the host name, Unix/Linux Resource Module (ULRM) information, time zone, NTP server(s) and the 2200 user ID for SOLAR installs. This server stays as designation 1.

Next, the FE logs into the Administration Console 524 for the secondary server 520 and runs the ICW. In the ICW, the FE chooses designation 2, does not set any public LAN information, optionally changes the host name, configures ULRM, time zone, NTP server(s) and the 2200 user ID for SOLAR installs.

From the 2200, WMQ is installed and pushed to both servers. This will create a "dummy"/var/mqm file system on the passive or secondary node (e.g., node 520 in FIG. 5) which will not be used.

Next, the FE logs into the control console for the first server and runs the Admin console 514. The FE is prompted to define both nodes of the cluster and choose the data store to be DRBD or external storage. If external storage is selected, it will be setup at this time. When the changes are applied, the disks are configured and the Cluster Information Base (CIB) is initialized. The CIB contains definitions of the cluster options, nodes, resources, their relationships to one another and current status. The CIB also synchronizes updates to all cluster nodes. The necessary changes are made to the passive node as well.

Next MQ resources are created. If done from the Administration Console 514 or 524, the Manage MQ module is cluster aware, so resources will be entered on the correct node. If done using a UNX module (not shown) in MQ daemon 532, they made to the system that has the /var/mqm file system mounted. Once MQ resources are created, the cluster is started and the MQ resources can be added to the cluster using the Manage MQ module or the Manage HA module with the admin console 514 or 524.

In the second scenario, the customer has one server up and running and orders a spare to enable HA clustering. The spare from manufacturing is not configured and is shipped with an IP address of 172.28.100.100.

The FE physically connects the second server into the existing AM LAN and logs into the Administration Console 514 or 524 to run the ICW. In the ICW, the FE sets the host name, the designation to a unique value (probably 2), does not configure the public LAN, configures ULRM, timezone and adds a 2200 userid.

Next, WMQ is installed onto the new server. SOLAR 531 and Interconnect 536 are used to push the WMQ installation to the new server.

The configure HA module is run from the Administration Console 514 or 524. The two nodes 510, 520 of the cluster are defined and the data store is selected; either DRBD or external storage. Once the changes are applied, the new file system is created and the CIB configured. If DRBD was selected, the disks are resynchronized which may take up to 90 minutes. Using the Administration Console 514 or 524, the cluster can be started and the queue managers and their resources can be added to the cluster.

In a third scenario, the user installs software updates. In this scenario, both nodes of the cluster are active and the MQ software requires an update to the node not currently running MQ workloads. To perform this update, the Interconnect is active, the MQ workload is running on the other node, /var/mqm is mounted since changes may need to be applied to /var/mqm. The user installs MQ updates by using the "Prep MQ Update" button in the HA Administration Console 514 and 524.

The software is installed on the node currently running MQ workloads (e.g., node 110 of FIG. 1, and STONITH is disabled on the other node so as not to start a failover operation. The resources stay up and running, which includes DRBD 525, STONITH 521 and Interconnect 536 and the file system is mounted. The queue managers are stopped and migrated to the remaining node, and the 2200 SOLAR 531 is directed to install to the active node. Then "STONITH is re-enabled.

The Administration Console 514 and 524 provides an intuitive and easy cluster setup for a customized MQ HA environment. The Administration Console 514 and 524 uses web interface, which can be used by a novice user. In some embodiments, new clusters can be setup for MQ in only a few minutes, even by inexperienced administrators.

In setting up a new cluster, the Administration Console 514 and 524 performs various functions. The Administration Console 514 and 524 uses secure internal bonded LAN for cluster communication. Setup is accomplished with minimal user intervention.

The Administration Console 514 and 524 creates LVM disk partition (FIG. 8) with little or no user interaction, allowing MQ backups with minimal disruption to running system. The LVM disk partition can be used to store state information so that when one node goes down, the state can be recreated on the other node. Administration Console 514 and 524 also creates DRBD disk partitions with little or no user interaction, tuned for MQ usage.

The Administration Console 514 and 524 creates MQ file systems with little or no user interaction. The individual cluster resource XML is wrapped as templates that require minimal user interaction to configure and utilize. The Administration Console 514 and 524 adds appropriate cluster resources and setting appropriate dependencies with little or no user interaction. Software resources for MQ include: STONITH 521, DRBD 525, LVM, MQ file system(s), network resources, and the like. MQ queue managers, if already defined, are added automatically as cluster resources along with any already defined MQ objects belonging to the queue managers.

Continuing with setting up an MQ HA cluster, steps are wrapped into scripts and predefined algorithms and executed by the Administration Console 514 and 524. Some embodiments include the use of cluster resource information stored in XML templates to reliably and quickly configure the cluster at any customer site with little user intervention as controlled by the Configure HA module. Examples of scripts include:
1. Setup.sh: Populates the cluster resource XML templates with the appropriate, user defined configuration values.
2. Drbdcreate: Unmounts file systems, removes /etc/fstab entries, securely copies the DRBD configuration to both cluster nodes, removes any preexisting file systems or previous DRBD configuration, creates the volume metadata, clears the bitmap and generates a new UUID. As part of the drbdcreate operation, appropriate steps are performed on both cluster nodes.
3. Lvmcreate: Removes any pre-existing LVM configuration, modifies the LVM filtering configuration on both nodes, unmounts file systems, creates physical volumes, creates volume groups, calculates logical volume size to leave snapshot headroom, creates logical volumes, restarts the LVM system service.
4. Cibadd.sh: Adds the already configured XML files that have been processed by setup.sh into the CIB to configure the HA cluster and create the cluster resources. Logic includes ability to add correct file system templates as well as correct STONITH pieces depending on user configuration.
5. Cibdel.sh: removes all cluster resources and allows the user to start over.

The examples below include scripts that are run by the Administration Console 514 and 524 on behalf of a user using the GUI, 541 (FIGS. 12-15) for easy setup. The user is not exposed to the underlying scripts in this embodiment. Before the cluster itself is setup, there is a Pacemaker setup. First, the user goes to the setup tool in the Administration Console 514 and 524 which populates the name-value pairs with the correct hostnames, IP addresses, etc in the setup.cf file.

Next, the setup.sh script is run to generate the configuration data from the setup.cf file. An examples script includes:

```
/opt/unisys/unisys-ha/setup.sh
```

An example of the setup.cf script is as follows:

```

# node 1 settings

NODE1_HOSTNAME=qpr1
NODE1_MGT_IP=172.28.102.11
NODE1_APP_IP=172.28.102.10
NODE1_APP_BROADCAST=172.28.255.255
NODE1_PUB_IP=192.63.233.61
NODE1_PUB_BROADCAST=192.63.233.255
NODE1_PUB_NETMASK=24
NODE1_BMC_IP=172.28.102.13

# node 2 settings

NODE2_HOSTNAME=qpr2
NODE2_MGT_IP=172.28.102.21
NODE2_BMC_IP=172.28.102.23

# global settings

DEFAULT_ROUTE=192.63.233.250
```

Still in pre-setup, the network is un-configured. The cluster will manage the public IP address, the application IP address and the default route. It will configure and un-configure the addresses as necessary. For this to work, the applicable interfaces are in a clean, pristine state before Pacemaker is started. The configure software continues by un-configuring any address setting for bond0:app and the public interfaces. Both of these will be resources managed by the clustering framework software.

Example scripts include:

```
sed -i /_app/d /etc/sysconfig/network/ifcfg-bond0
ifdown bond0; ifup bond0
```

Next, un-configure any address settings for public by removing any values configured for the BOOTPROTO, IPADDR, NETMASK, NETWORK and BROADCAST parameters. The lines can deleted or replaced with blank values.

For the Intel SR1500, example edit the following file:

```
/etc/sysconfig/network/ifcfg-eth-bus-pci-0000:04:00.1
```

Then bring down and up the interface according to a script like in the example below:

```
ifdown public; ifup public
```

The configure software continues to unconfigure the networking resources on Node2 using the same scripts as above.

Next, the DRDB 525 is set up. The DRBD devices can be created using the drbdcreate script referenced below. This script will automatically unmount MQ file systems, distribute the drbd.conf to both nodes, zero out the devices, create the DRBD meta data, bring the device online and clear the uuid bitmap so that the sync time is reduced to 0.

With some embodiments the drbdcreate script can be used to configure the DRBD devices. The drbdcreate tool will perform setup on both the local and remote system. Example use of the drbdcreate script includes:

```
./drbdcreate <remote_host_name> <full_path_drbd.conf_to_use>
i.e. - ./drbdcreate qpr2 /opt/unisys/unisys-ha/drbd-single.conf
```

The last step in the pre-setup in this example includes setting up the LVM disk partition. Using Logical Volume manager will allow the creation of point in time snapshots of the MQ file system. This enhances queue manager backup, as the queue manager only has to be down long enough to generate a snapshot (<1 second).

With some embodiments an lvmcreate tool can be used to configure all of the necessary LVM containers including physical volumes, volume groups and logical volumes. The lvmcreate tool is meant to work with DRBD devices and will do the setup for both the local and remote node.

Example use of the tool includes:

```
./lvmcreate <full_path_to_drbd_device> <remote_host_name>
i.e. - ./lvmcreate /dev/drbd0 qpr2
```

Once lvmcreate has finished, the JFS file system is created. If not using LVM, the JFS file system is created once drbd-create has finished For DRBD and LVM the following example code may be used.

```
mkfs.jfs -f /dev/vg-mq/lv-mq
```

For DRBD only (no LVM), the following example code may be used.

```
mkfs.jfs -f /dev/drbd0
```

The configure software sets up the Heartbeat configuration next. The following example steps will configure Heartbeat and start up a minimal cluster with 0 resources.

On node 1, copy the master Heartbeat configuration file to the proper location: cp/opt/unisys/unisys-ha/ha.cf/etc/ha.d/. The configure software creates a valid ha.d file from the user input. This file isaved in the ha.cf file and copied to the ha.d file.

The authkeys file was created at RPM install time with a unique md5. On NODE1, copy the authkeys file to the proper location: cp/opt/unisys/unisys-ha/authkeys/etc/ha.d/. Propagate the core configuration files to all cluster nodes with the example script: /usr/share/Heartbeat/ha_propagate The, DRDB 525 is stopped and disabled. DRBD 525 is started and stopped by the cluster so automatic startup should be disabled. Omit this step if using shared, external storage.

After DRBD has finished its initial sync, stop and disable the DRBD service

At node 1, the following example scripts can be used:

```
drbd-overview (to verify sync has completed)
service drbd stop
chkconfig drbd off
```

Then, the Heartbeat is started on both nodes. For node 1, the following example scripts can be used:

```
chkconfig Heartbeat on
service Heartbeat start
```

For node 1, the following example scripts can be used:

```
chkconfig Heartbeat on
service Heartbeat start
```

The configure software waits until the cluster is started before continuing.

The next step is to add resources. Once the configure software detects that both cluster nodes are online, it continues by adding the necessary resources. This stage will install all necessary global cluster settings, constraints and resources into the CIB. The cluster software uses templates that are called by a script cibadd.sh. The cibadd.sh script can optionally add resources for DRBD or external storage. This script adds all required resources to the CIB using the cibadmin command. The following example scripts may be used:

```
cd /opt/unisys/unisys-ha
./cibadd.sh [1|2]
```

Output may be as follows. Example is for a single DRBD setup on VMware VMs:

```
qpr5:/opt/unisys/unisys-ha # ./cibadd.sh
```

This example script will add the following into a clean CIB:

```
- global crm_config cluster parameters
- colocation and ordering constraints
- dual drbd resource agents
- networking group (public IP, application IP, default route)
- MQ group resource agent
- interconnect clone resource agent
- SSH STONITH resource agents for VMware platforms
Press [ENTER] to continue
[stage1] adding global cluster parameters... done
[stage1] adding constraints... done
[stage2] adding single drbd resource(s)... done
[stage2] adding networking resource... done
[stage2] adding mq group resource... done
[stage2] adding interconnect clone resource... done
[stage3] adding stonith resource... done
This completes cluster setup.
```

The following section describes example templates that can be used as part of cluster setup.

To set up the file system and DRDB, the following templates may be used in some embodiments.

```
<!-- var-mqm file system, var-mqm-log file system -->
<configuration>
<resources>
    <!--                                          -->
    <!-- single drbd resource configuration       -->
    <!--                                          -->
    <!-- ms_drbd0 -> /dev/drbd0 -> /var/mqm       -->
    <!--                                          -->
    <master id="Replication">
        <meta_attributes id="Replication-meta_attributes">
            <nvpair id="Replication-meta_attributes-master-max" name="master-max" value="1"/>
            <nvpair id="Replication-meta_attributes-master-node-max" name="master-node-max" value="1"/>
            <nvpair id="Replication-meta_attributes-clone-max" name="clone-max" value="2"/>
            <nvpair id="Replication-meta_attributes-clone-node-max" name="clone-node-max"
```

-continued

```xml
value="1"/>
            <nvpair id="Replication-meta_attributes-notify" name="notify" value="true"/>
        </meta_attributes>
        <primitive class="ocf" id="drbd" provider="linbit" type="drbd">
            <instance_attributes id="drbd-instance_attributes">
                <nvpair id="drbd-instance_attributes-drbd_resource" name="drbd_resource" value="var-mqm"/>
            </instance_attributes>
            <operations>
                <op id="drbd-monitor-60s" interval="60s" name="monitor" role="Master" timeout="30s"/>
                <op id="drbd-monitor-100s" interval="100s" name="monitor" role="Slave" timeout="30s"/>
                <op id="drbd-start-0" name="start" interval="0" timeout="2m"/>
                <op id="drbd-stop-0" name="stop" interval="0" timeout="2m"/>
            </operations>
        </primitive>
    </master>
    <primitive class="ocf" id="mq_filesystem" provider="Heartbeat" type="Filesystem">
        <meta_attributes id="mq_filesystem_meta_attributes">
            <nvpair id="mq_filesystem-migration_threshold" name="migration-threshold" value="5"/>
        </meta_attributes>
        <instance_attributes id="mq_filesystem-instance_attributes">
            <nvpair id="mq_filesystem-instance_attributes-device" name="device" value="/dev/vg-mq/lv-mq"/>
            <nvpair id="mq_filesystem-instance_attributes-directory" name="directory" value="/var/mqm"/>
            <nvpair id="mq_filesystem-instance_attributes-fstype" name="fstype" value="jfs"/>
        </instance_attributes>
        <operations>
            <op id="mq_filesystem-monitor-60s" interval="60s" name="monitor" timeout="45s"/>
            <op id="mq_filesystem_mqm-start-0" interval="0" name="start" timeout="3m"/>
            <op id="mq_filesystem-stop-0" interval="0" name="stop" timeout="2m"/>
        </operations>
    </primitive>
    <primitive class="ocf" id="mq_logicalvol" provider="Heartbeat" type="LVM">
        <meta_attributes id="mq_logicalvol-meta_attributes">
            <nvpair id="mq_logicalvol-migration_threshold" name="migration-threshold" value="5"/>
        </meta_attributes>
        <instance_attributes id="mq_logicalvol-instance_attributes">
            <nvpair id="mq_logicalvol-instance_volgrpname" name="volgrpname" value="vg-mq"/>
            <nvpair id="mq_logicalvol-instance_exclusive" name="exclusive" value="true"/>
        </instance_attributes>
        <operations>
            <op id="mq_logicalvol-monitor-2m" interval="2m" name="monitor" timeout="90s"/>
            <op id="mq_logicalvol-start-0" interval="0" name="start" timeout="3m"/>
            <op id="mq_logicalvol-stop-0" interval="0" name="stop" timeout="2m"/>
        </operations>
    </primitive>
</resources>
<constraints>
    <rsc_colocation id="colocation-mq_logicalvol" rsc="mq_logicalvol" score="INFINITY" with-rsc="Replication" with-rsc-role="Master"/>
    <rsc_colocation id="colocation-mq_filesystem" rsc="mq_filesystem" score="INFINITY" with-rsc="Replication" with-rsc-role="Master"/>
    <rsc_order id="order-mq_logicalvol" first="Replication" first-action="promote" score="INFINITY" then="mq_logicalvol" then-action="start"/>
    <rsc_order id="order-mq_filesystem" first="mq_logicalvol" first-action="start" score="INFINITY" then="mq_filesystem" then-action="start"/>
</constraints>
</configuration>
```

To set up the file system external, the following template may be used:

```xml
<!-- var-mqm file system, var-mqm-log file system -->
<configuration>
<resources>
        <primitive class="ocf" id="mq_filesystem" provider="Heartbeat"
```

```
type="Filesystem">
        <meta_attributes id="var_mqm_meta_attributes">
                <nvpair id="mq_filesystem-migration-threshold" name="migration-threshold" value="5"/>
        </meta_attributes>
        <instance_attributes id="mq_filesystem-instance_attributes">
                <nvpair id="mq_filesystem-instance_attributes-device" name="device" value="/dev/vg-mq/lv-mq"/>
                <nvpair id="mq_filesystem-instance_attributes-directory" name="directory" value="/var/mqm"/>
                <nvpair id="mq_filesystem-instance_attributes-fstype" name="fstype" value="jfs"/>
        </instance_attributes>
        <operations>
                <op id="mq_filesystem-monitor-60s" interval="60s" name="monitor" timeout="100s"/>
                <op id="mq_filesystem-start-0" interval="0" name="start" timeout="3m"/>
                <op id="mq_filesystem-stop-0" interval="0" name="stop" timeout="3m"/>
        </operations>
</primitive>
<primitive class="ocf" id="mqlog_filesystem" provider="Heartbeat" type="Filesystem">
        <meta_attributes id="var_mqm_log_meta_attributes">
                <nvpair id="var_mqm_log_migration-threshold" name="migration-threshold" value="5"/>
        </meta_attributes>
        <instance_attributes id="mqlog_filesystem-instance_attributes">
                <nvpair id="mqlog_filesystem-instance_attributes-device" name="device" value="/dev/vg-mq-log/lv-mq-log"/>
                <nvpair id="mqlog_filesystem-instance_attributes-directory" name="directory" value="/var/mqm/log"/>
                <nvpair id="mqlog_filesystem-instance_attributes-fstype" name="fstype" value="jfs"/>
        </instance_attributes>
        <operations>
                <op id="mqlog_filesystem-monitor-60s" interval="60s" name="monitor" timeout="100s"/>
                <op id="mqlog_filesystem-start-0" interval="0" name="start" timeout="3m"/>
                <op id="mqlog_filesystem-stop-0" interval="0" name="stop" timeout="3m"/>
        </operations>
</primitive>
<primitive class="ocf" id="mq_logicalvol" provider="Heartbeat" type="LVM">
        <meta_attributes id="lvm-mq_meta_attributes">
                <nvpair id="mq_logicalvol-migration-threshold" name="migration-threshold" value="5"/>
        </meta_attributes>
        <instance_attributes id="mq_logicalvol-instance_attributes">
                <nvpair id="mq_logicalvol-instance_volgrpname" name="volgrpname" value="vg-mq"/>
                <nvpair id="mq_logicalvol-instance_exclusive" name="exclusive" value="true"/>
        </instance_attributes>
        <operations>
                <op id="mq_logicalvol-monitor-2m" interval="2m" name="monitor" timeout="90s"/>
                <op id="mq_logicalvol-start-0" interval="0" name="start" timeout="3m"/>
                <op id="mq_logicalvol-stop-0" interval="0" name="stop" timeout="3m"/>
        </operations>
</primitive>
<primitive class="ocf" id="mqlog_logicalvol" provider="Heartbeat" type="LVM">
        <meta_attributes id="mq_logicalvol-log_meta_attributes">
                <nvpair id="mqlog_logicalvol-migration-threshold" name="migration-threshold" value="5"/>
        </meta_attributes>
        <instance_attributes id="mqlog_logicalvol-instance_attributes">
                <nvpair id="mqlog_logicalvol-instance_volgrpname" name="volgrpname" value="vg-mq-log"/>
                <nvpair id="mqlog_logicalvol-instance_exclusive" name="exclusive" value="true"/>
        </instance_attributes>
        <operations>
                <op id="mqlog_logicalvol-monitor-2m" interval="2m" name="monitor" timeout="90s"/>
                <op id="mqlog_logicalvol-start-0" interval="0" name="start" timeout="3m"/>
                <op id="mqlog_logicalvol-stop-0" interval="0" name="stop" timeout="3m"/>
        </operations>
</primitive>
</resources>
<constraints>
        <rsc_colocation id="colocation-mq_logicalvol" rsc="mq_filesystem"
```

```
score="INFINITY" with-rsc="mq_logicalvol"/>
        <rsc_order id="order-filesystem1" first="mq_logicalvol" first-action=" start"
score="INFINITY" then="mq_filesystem" then-action="start"/>
        <rsc_colocation id="colocation-mqlog_logicalvol" rsc="mq_filesystem"
score="INFINITY" with-rsc="mqlog_logicalvol"/>
        <rsc_order id="order-filesystem2" first="mqlog_logicalvol" first-action="start"
score="INFINITY" then="mqlog_filesystem" then-action="start"/>
    </constraints>
</configuration>
```

The following template may be used to add network resources to the cluster:

```
<!-- networking group - contains the application IP address, public    -->
<!--       IP address and default route       -->
<configuration>
    <resources>
        <primitive class="ocf" id="appIP" provider="Heartbeat" type="IPaddr2">
            <meta_attributes id="appIP_meta_attributes">
                <nvpair id="appIP-migration_threshold" name="migration-threshold" value="5"/>
            </meta_attributes>
            <instance_attributes id="appIP-instance_attributes">
                <nvpair id="appIP-instance_attributes-ip" name="ip"
value="<NODE1_APP_IP>"/>
                <nvpair id="appIP-instance_attributes-cidr_netmask" name="cidr_netmask"
value="16"/>
                <nvpair id="appIP-instance_attributes-broadcast" name="broadcast"
value="<NODE1_APP_BROADCAST>"/>
                <nvpair id="appIP-instance_attributes-nic" name="nic" value="bond0:app"/>
            </instance_attributes>
            <operations>
                <op id="appIP-monitor-2m" interval="2m" name="monitor" timeout="90s"/>
                <op id="appIP-start-0" interval="0" name="start" timeout="3m" on-fail="restart"/>
                <op id="appIP-stop-0" interval="0" name="stop" timeout="3m"/>
            </operations>
        </primitive>
        <primitive class="ocf" id="pubIP" provider="Heartbeat" type="IPaddr2">
            <meta_attributes id="pubIP_meta_attributes">
                <nvpair id="pubIP-migration_threshold" name="migration-threshold" value="5"/>
            </meta_attributes>
            <instance_attributes id="pubIP-instance_attributes">
                <nvpair id="pubIP-instance_attributes-ip" name="ip"
value="<NODE1_PUB_IP>"/>
                <nvpair id="pubIP-instance_attributes-cidr_netmask" name="cidr_netmask"
value="<NODE1_PUB_NETMASK>"/>
                <nvpair id="pubIP-instance_attributes-broadcast" name="broadcast"
value="<NODE1_PUB_BROADCAST>"/>
                <nvpair id="pubIP-instance_attributes-nic" name="nic" value="public"/>
            </instance_attributes>
            <operations>
                <op id="pubIP-monitor-2m" interval="2m" name="monitor" timeout="90s"/>
                <op id="pubIP-start-0" interval="0" name="start" timeout="3m" on-fail="restart"/>
                <op id="pubIP-stop-0" interval="0" name="stop" timeout="3m"/>
            </operations>
        </primitive>
        <primitive class="ocf" id="default_route" provider="Heartbeat" type="Route">
            <meta_attributes id="default_route_meta_attributes">
                <nvpair id="default_route-migration_threshold" name="migration-threshold"
value="5"/>
            </meta_attributes>
            <instance_attributes id="default_route-instance_attributes">
                <nvpair id="default_route-instance_attributes-destination" name="destination"
value="default"/>
                <nvpair id="default_route-instance_attributes-device" name="device"
value="public"/>
                <nvpair id="default_route-instance_attributes-gateway" name="gateway"
value="<DEFAULT_ROUTE>"/>
            </instance_attributes>
            <operations>
                <op id="default_route-monitor-2m" interval="2m" name="monitor"
timeout="90s"/>
                <op id="default_route-start-0" interval="0" name="start" timeout="3m" on-
fail="restart"/>
                <op id="default_route-stop-0" interval="0" name="stop" timeout="3m"/>
            </operations>
```

-continued

```
        </primitive>
    </resources>
    <constraints>
        <!-- colocate resources with Replication resource, with_rsc starts first -->
        <rsc_colocation id="colocation-appIP" rsc="appIP" score="INFINITY" with-rsc="Replication" with-rsc-role="Master"/>
        <rsc_order id="order-appIP" first="var_mqm" first-action="start" score="INFINITY" then="appIP" then-action="start"/>
<!-- colocate resources with var_mqm, with_rsc starts first -->
        <rsc_colocation id="colocation-pubIP" rsc="pubIP" score="INFINITY" with-rsc="Replication" with-rsc-role="Master"/>
        <rsc_order id="order-pubIP" first="var_mqm" first-action="start" score="INFINITY" then="pubIP"/>
        <!-- start pubIP before default_route -->
        <rsc_order first="pubIP" first-action="start" id="order-default_route" score="INFINITY" then=" default_route "/>
<rsc_colocation id="colocation-default_route rsc=" default_route " score="INFINITY" with-rsc="Replication" with-rsc-role="Master"/>
        <rsc_order id="order- default_route " first="var_mqm" first-action="start" score="INFINITY" then=" default_route " then-action="start"/>
    </constraints>
</configuration>
```

The following template can be used to configure STONITH:

```
<!-- stonith - external/ipmi stonith resource, works only on Intel SR1500 BMC -->
<!-- linux-ha documentation suggests that stonith devices be checked at long intervals to avoid -->
<!-- overloading the device, which is not designed to handle frequent connections
    -->
<!-- stonith0 is the conf for power control of NODE1, so it must run on NODE2 -->
<configuration>
    <resources>
        <primitive id="stonith0" class="stonith" type="external/ipmi">
            <operations>
                <op id="stonith0-monitor" name="monitor" interval="60m" timeout="5m"/>
                <op id="stonith0-start-0" interval="0" name="start" timeout="5m" on-fail="restart"/>
                <op id="stonith0-stop-0" interval="0" name="stop" timeout="5m"/>
            </operations>
            <instance_attributes id="stonith0-instance_attributes">
                <nvpair id="stonith0-hostname" name="hostname" value="<NODE1_HOSTNAME>"/>
                <nvpair id="stonith0-ipaddr" name="ipaddr" value="<NODE1_BMC_IP>"/>
                <nvpair id="stonith0-userid" name="userid" value="ipmi"/>
                <nvpair id="stonith0-passwd" name="passwd" value="secret"/>
            </instance_attributes>
        </primitive>
<!-- stonith1 is the conf for power control of NODE2, so it must run on NODE1 -->
        <primitive id="stonith1" class="stonith" type="external/ipmi">
            <operations>
                <op id="stonith1-monitor" name="monitor" interval="60m" timeout="5m"/>
                <op id="stonith1-start-0" interval="0" name="start" timeout="5m" on-fail="restart"/>
                <op id="stonith1-stop-1" interval="0" name="stop" timeout="5m"/>
            </operations>
            <instance_attributes id="stonith1-instance_attributes">
                <nvpair id="stonith1-hostname" name="hostname" value="<NODE2_HOSTNAME>"/>
                <nvpair id="stonith1-ipaddr" name="ipaddr" value="<NODE2_BMC_IP>"/>
                <nvpair id="stonith1-userid" name="userid" value="ipmi"/>
                <nvpair id="stonith1-passwd" name="passwd" value="secret"/>
            </instance_attributes>
        </primitive>
    </resources>
    <constraints>
        <rsc_location id="location-stonith0" node="<NODE1_HOSTNAME>" rsc="stonith0" score="-INFINITY"/>
        <rsc_location id="location-stonith1" node="<NODE2_HOSTNAME>" rsc="stonith1" score="-INFINITY"/>
    </constraints>
</configuration>
```

The following template can be used to configure MQ:

```
<configuration>
<resources>
<primitive id="<QM_NAME>" class="ocf" type="WMQ" provider="unisys">
    <meta_attributes id="<QM_NAME>_meta_attributes">
        <nvpair id="<QM_NAME>-migration_threshold" name="migration-threshold" value="5"/>
    </meta_attributes>
    <operations>
            <op id="<QM_NAME>-monitor-60s" name="monitor" interval="60s" timeout="100s" />
            <op id="<QM_NAME>-start-0" name="start" interval="0" timeout="15min" on-fail="restart"/>
        </operations>
    <instance_attributes id="ia_<QM_NAME>">
            <nvpair id="ia_<QM_NAME>-qm_name" name="qm_name" value="<QM_NAME>"/>
        </instance_attributes>
    </primitive>
</resources>
    <constraints>
        <rsc_colocation id="colocation-var-mqm-<QM_NAME>" rsc="<QM_NAME>" score="INFINITY"with-rsc="var_mqm"/>
        <rsc_order id="order-<QM_NAME>" first="var_mqm" first-action="start" score="INFINITY" then="<QM_NAME>" then-action="start"/>
    </constraints>
</configuration>
```

Figure 12:
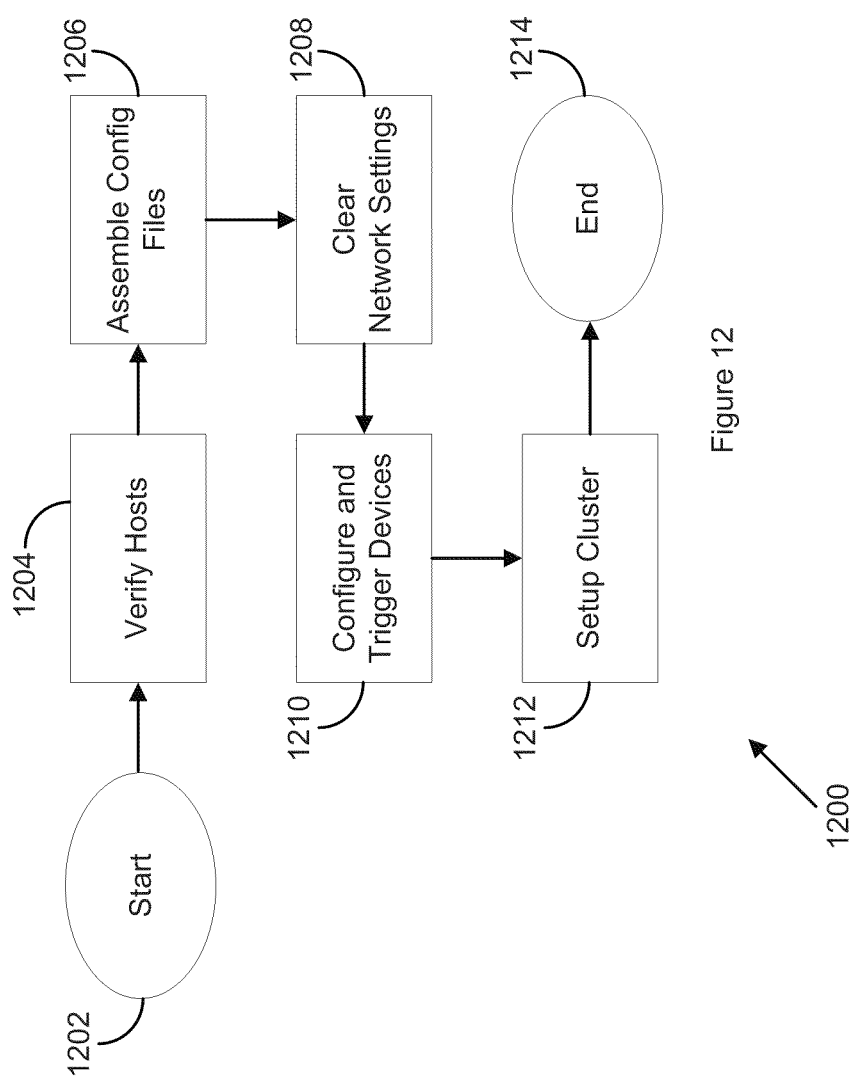
FIG. 12 is an illustration of an exemplary process adapted, according to one example embodiment of the present disclosure.

Referring to FIG. 12, an example flowchart of a method 1200 for configuring a cluster is illustrated. Logical flow begins at a start block 1202. A verify module 1204 performs the following functions:

```
Verifying the /etc/hosts file on usrv-qtest1;
    Verifying the usrv-qtest1 entry in the /etc/hosts file;
    Verifying the usrv-qtest2 entry in the /etc/hosts file;
Verifying the /etc/hosts file on usrv-qtest2;
    Verifying the usrv-qtest1 entry in the /etc/hosts file;
    Verifying the usrv-qtest2 entry in the /etc/hosts file.
```

A assemble module 1206 assembles configuration files:

```
Clearing existing cluster configurations settings from
usrv-qtest1 node;
Clearing existing cluster configurations settings from
usrv-qtest2 nod;e
Building setup parameter file;
Generating the cluster configuration files.
```

A clean module cleans the network settings on cluster nodes:

```
Clearing usrv-qtest1 network interface settings;
Clearing usrv-qtest2 network interface settings.
```

A configure module 1210 configures and triggers the DRBD devices between the cluster nodes:

```
Creating DRBD device;
Executing the lvmcreate script to configure the LVM devices;
Creating a file system on DRBD device;
Verifying initial DRBD synchronization.
```

A setup module 1212 setups the cluster:

```
Copying heartbeat configuration to destination directory;
Propagating the core configuration files to the cluster nodes;
Stopping and disabling the DRBD devices on usrv-qtest1;
Stopping and disabling the DRBD devices on usrv-qtest2;
Starting the heartbeat service on usrv-qtest1;
Starting the heartbeat service on usrv-qtest2;
Attempting connection to the cluster;
Installing all necessary global cluster settings,
constraints and resources into the CIB;
Restoring /var/mqm/ files.
```

Referring back to FIG. 5, the Q processor architecture illustrated is new and non-obvious. Preferably, the OS 2200 QProcessor is an integrated 1U-high Intel-based system that processes the WebSphere MQ requests and communications with the OS 2200 system and other remote clients such as the JBoss Application Server by means of the AM LAN for all I/O. The OS 2200 QProcessor accepts requests from the OS 2200 system only for WebSphere MQ processing and communicates all responses back to the OS 2200 System. Preferably, the OS 2200 QProcessor contains the following software components: embedded Linux operating system, administration console software, interconnect software, and various utility software. Preferably, the architecture includes the following redundant features:

Two network interfaces that are bonded so if one fails, the other takes over seamlessly. This is for connection to the AM-LAN;

Dual port Fibre Channel interface that is located on a dual port Fibre Channel Hot Bus Adapter (HBA). These ports are used to connect to optional Storage Area Network (SAN);

Two Dual Core Intel Xeon processors;

Raided disks so data is protected on a single box;

Two GS724-SWX switches, which act as the AM LAN switches; and

Two Operations Servers that receive alert messages to a central console for the OS 2200 Complex.

The AM LAN is used to administer the device. The device uses the private AM LAN to communicate with the OS2200

Host and Operations Servers (OP Server). There are two bonded AM LAN ports on the device. Each AM LAN port connects to a port on a dedicated AM switch. Similarly, there is a port on the AM switch to the Operations Server and to an Ethernet port on the OS 2200 Server.

Preferably, the QProcessor Architecture provides the following integrated system tasks:

- Installation of MQ onto the QProcessor is done through standard OS 2200 installation tool names SOLAR. The OS 2200 administrators will operate the installation program and as an extension to this process, the software will use the Interconnect to "push" the Linux software for MQ to the QProcessor. The OS 2200 administrators don't "see" the linux systems, they are viewed as an extension of the OS 2200.
- Central Administration—All Alerts are sent to the Operations Console using existing Unisys Software. The user sees the QProcessors as another box that is monitored from a central place. The Administration Console GUI is launched from the Central Operations Console as well. The browser based interface provides capabilities to configure such items as network addresses and other system specific information; add, remove and manage MQ specific objects; perform backup restore of MQ data to the OS 2200 system; gather and upload diagnostic files to the web browser system; create and manage user id mappings from the OS 2200 system to QProcessor (linux) users and groups for access control to MQ; determine health of the Qprocessor.
- Remote Administration from OS 2200 to manage MQ on the QProcessor. This is done through an OS 2200 Processor called UNX. The UNX program includes all of the components that will make up and support the MQ shell interface that a user will see on the 2200 system. This includes, but is not limited to, the 2200 UNX executable, the Interconnect library, the offloaded shell on the Linux side of the Interconnect, Linux programs that are executed by the shell, MQSeries command programs that are used to administer and maintain queue managers (the so called control commands such as crt-mqm, strmqm, runmqsc, etc), and all other related components and features to be implemented as part of the shell architecture.

The following are some of the advantages of the Qprocessor Architecture:

1. Allow upwards compatibility with the current UNX shell.
2. Allow the Linux offload program to perform the Linux function returning output to the 2200 UNX shell.
3. The shell should appear as interactive and real time as possible. Output from programs should not be delayed from display to the user any longer than necessary.
4. Provide a secure environment that does not allow users to access, view, or alter anything outside of the scope of the MQSeries product, particularly on the Linux side.
5. Ensure that only authorized users can enter the MQS2200 shell and in turn prevent unauthorized users from calling across the Interconnect.
6. Ensure that all processes started on the Linux side run under the userid mapped from the Interconnect usermap file.

Wrappers are provided to allow OS 2200 Client programs transparent access to MQ queue managers and their data in a fast efficient way. The OS 2200 Client programs use standard MQ API to connect, get and put messages to MQ queue managers. It is transparent to them that the actual processing is done on the QProcessor Specialty Engine. Infrastructure was developed to seamlessly create a MQ user process environment on the QProcessor which mirrors the OS 2200 client process. It maps security credentials from the OS 2200 user to a Linux user and group so standard MQ security algorithms can be used.

Figure 13:
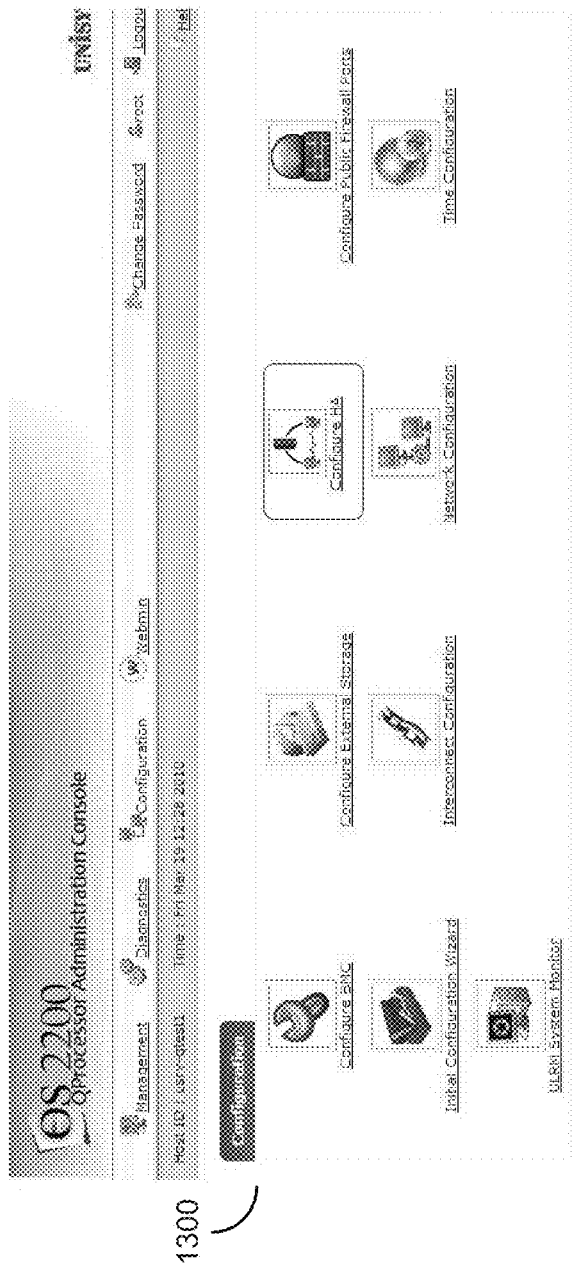
FIGS. 13-21 illustrate an example GUI for use, according to one example embodiment of the present disclosure.
Figure 14:
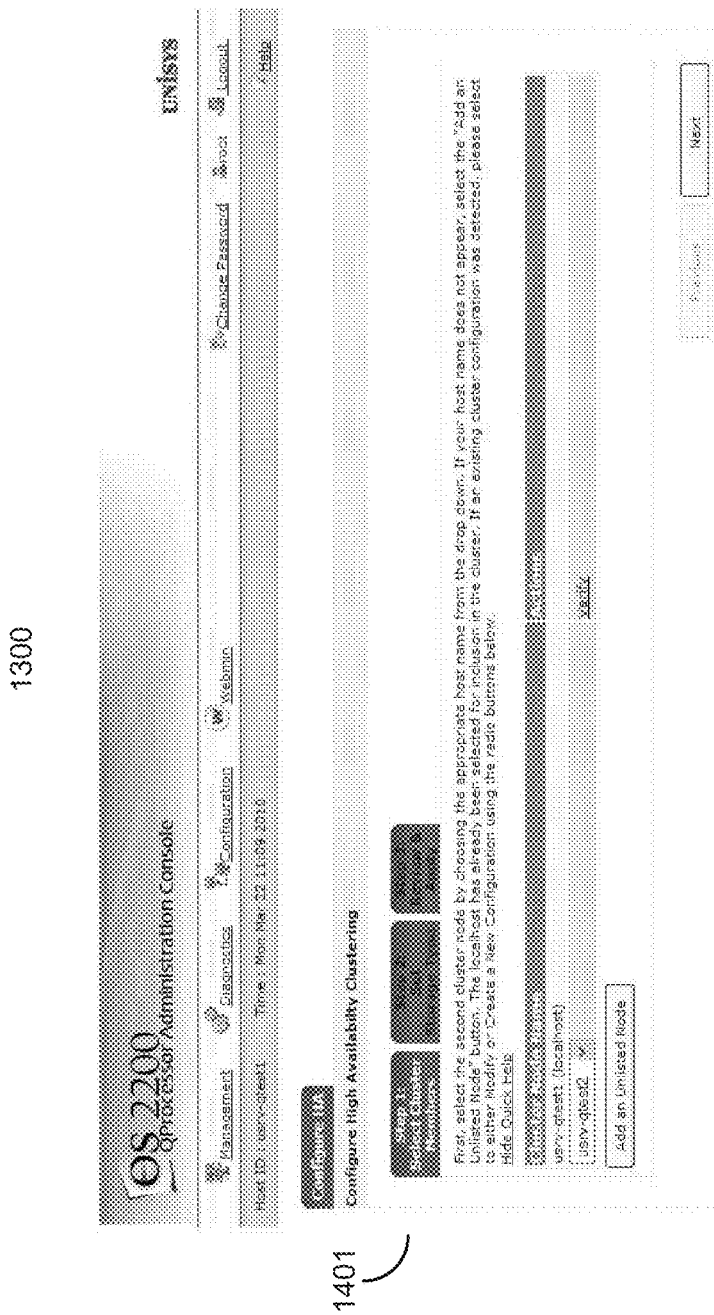
Figure 15:
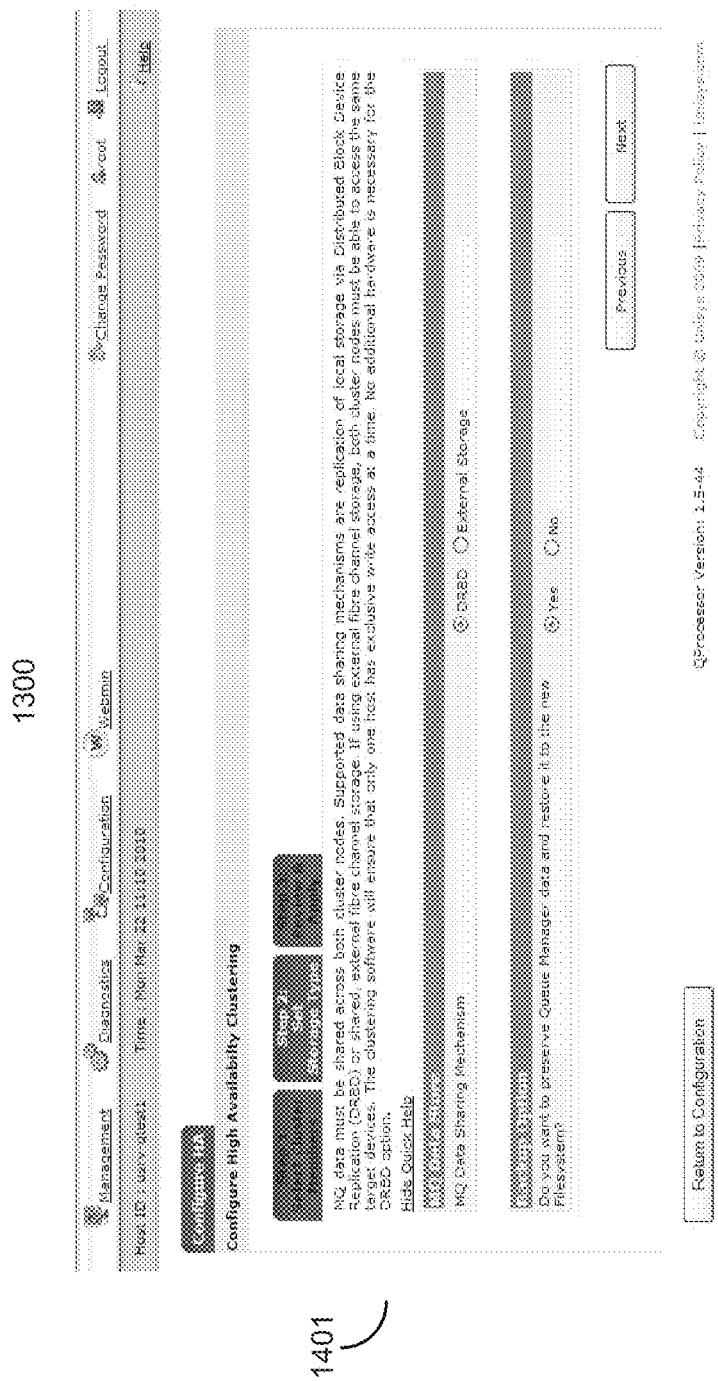
Figure 16:
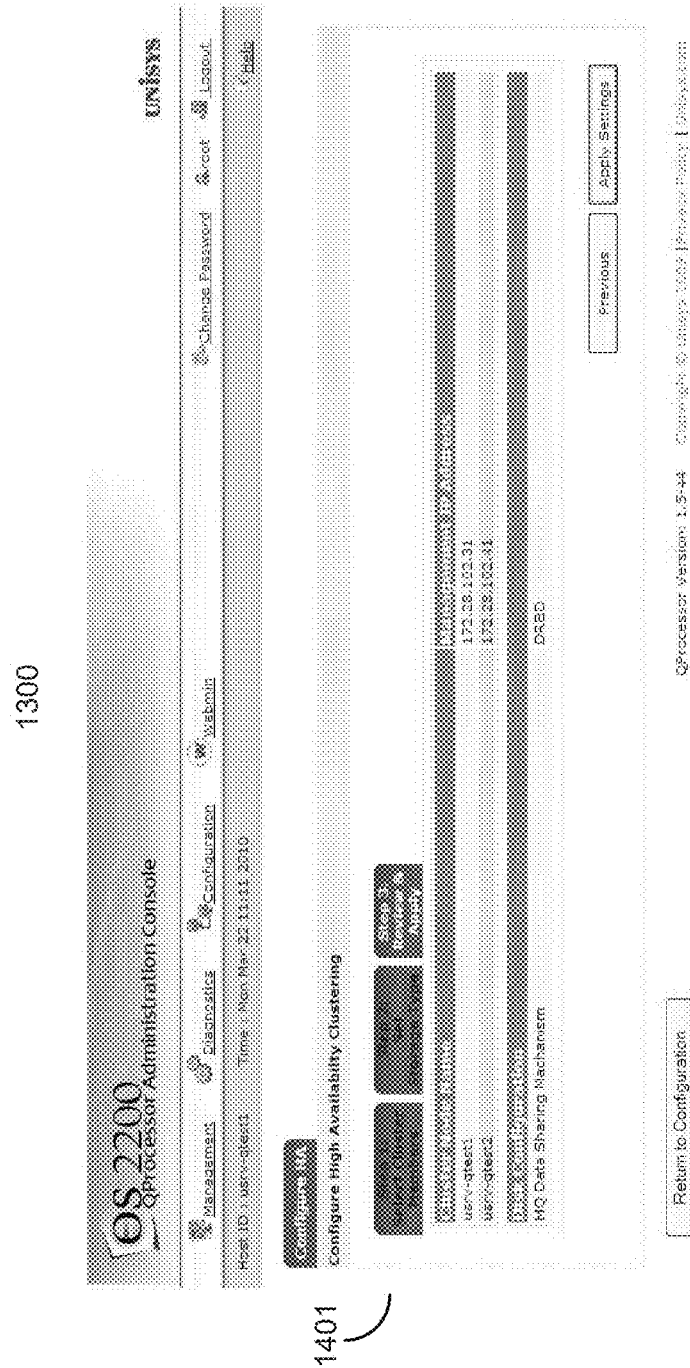

FIG. 13 is an illustration of a GUI 1300 provided by the Administration Console 514 and 524 (FIG. 5), adapted according to one embodiment. In GUI 1300, the user selects the Configure HA icon 1401, which moves the user to the configure HA wizard 1401, shown in FIGS. 14-16. The wizard 1401 solicits a few items from the user discovering already configured network settings and create the HA templates and new cluster.

The GUI 1300 includes characteristics that an OS 2200 user is accustomed to. For instance, stylistic effects, such as margins, tabs, colors, and the like are the same or similar as that found in OS 2200 GUIs. Furthermore, network terminology is the same as that used by OS 2200 operators, to the extent possible. The GUI functional features, such as check boxes, buttons, and navigation features, are also the same as in OS 2200 GUIs. In some examples, the GUI 1300 may be based on a same template as that used for OS 2200 GUI. The GUI 1300 may provide a look and feel that allows OS 2200 users to feel at home.

After the cluster is setup, the system can then monitor the nodes 510, 520. Returning to FIG. 5, in another aspect, a mechanism is provided for the admin console 534 to accurately monitor the state of MQ queue managers and their associated MQ objects. MQ OCF is specially designed to allow the cluster to monitor MQ queue managers and their resources. This allows a user to control monitor actions from the cluster and decide when an MQ resource should be deemed as "running" or "not running".

Also, there is Hbquery for passive node 520, which is a software tool for detecting which node of the cluster is running MQ traffic. In the active/passive cluster, only one node of the cluster can run MQ. This is also used to tell if the cluster is installed, configured and available. It is used as a basis for other software and to display reliable accurate status to the user. There is also a tool for detecting if a queue manager resource or one of their associated objects are "running".

Once a cluster is up and running, the cluster is managed in a new and non-obvious way. In particular the Administration Console 514 and 524 provides a new way to manage the cluster. In one aspect, a tool that allows users to install MQ updates from a remote OS 2200 system to the Administration Console 514 and 524. This methodology uses a remote shell and is tied into the Interconnect 536. The Administration Console 514 and 524 also has a methodology for replacing a node in the cluster with new hardware.

Figure 7:
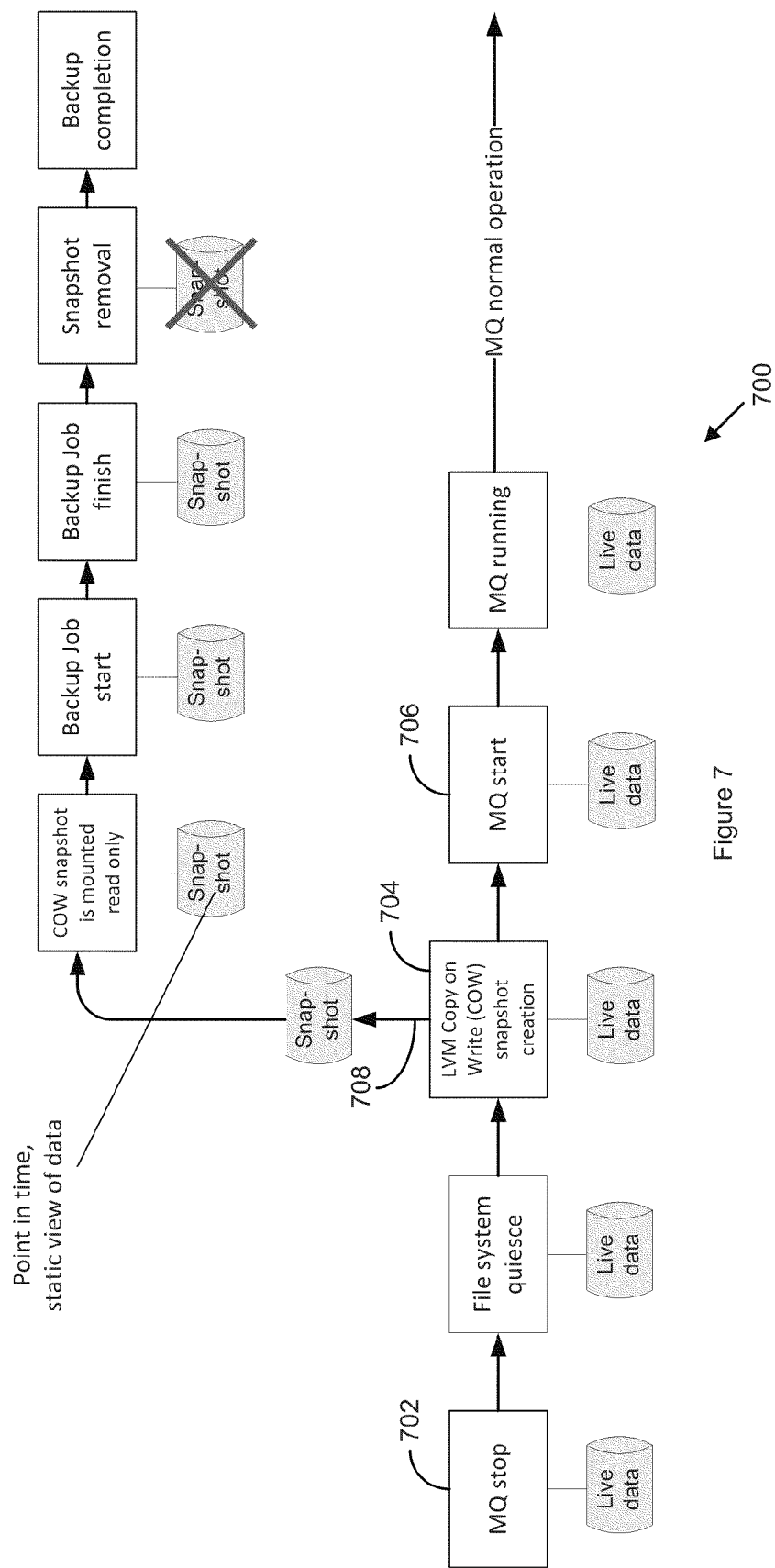
FIG. 7 is an illustration of an exemplary process of an LVM snapshot, according to one example embodiment of the present disclosure.

When adding MQ resources, there are templates for queue manager and the object types. A simple query for one or two important pieces of information feeds into the template which then enables adding new queue managers to the cluster. There is also a single push button interface in the GUI. Dependencies with the other resource File System (FS), LVM (FIG. 7), DRBD 525 are defined and worked out by the Administration Console 514 and 524, so the user is not burdened.

Figure 17:
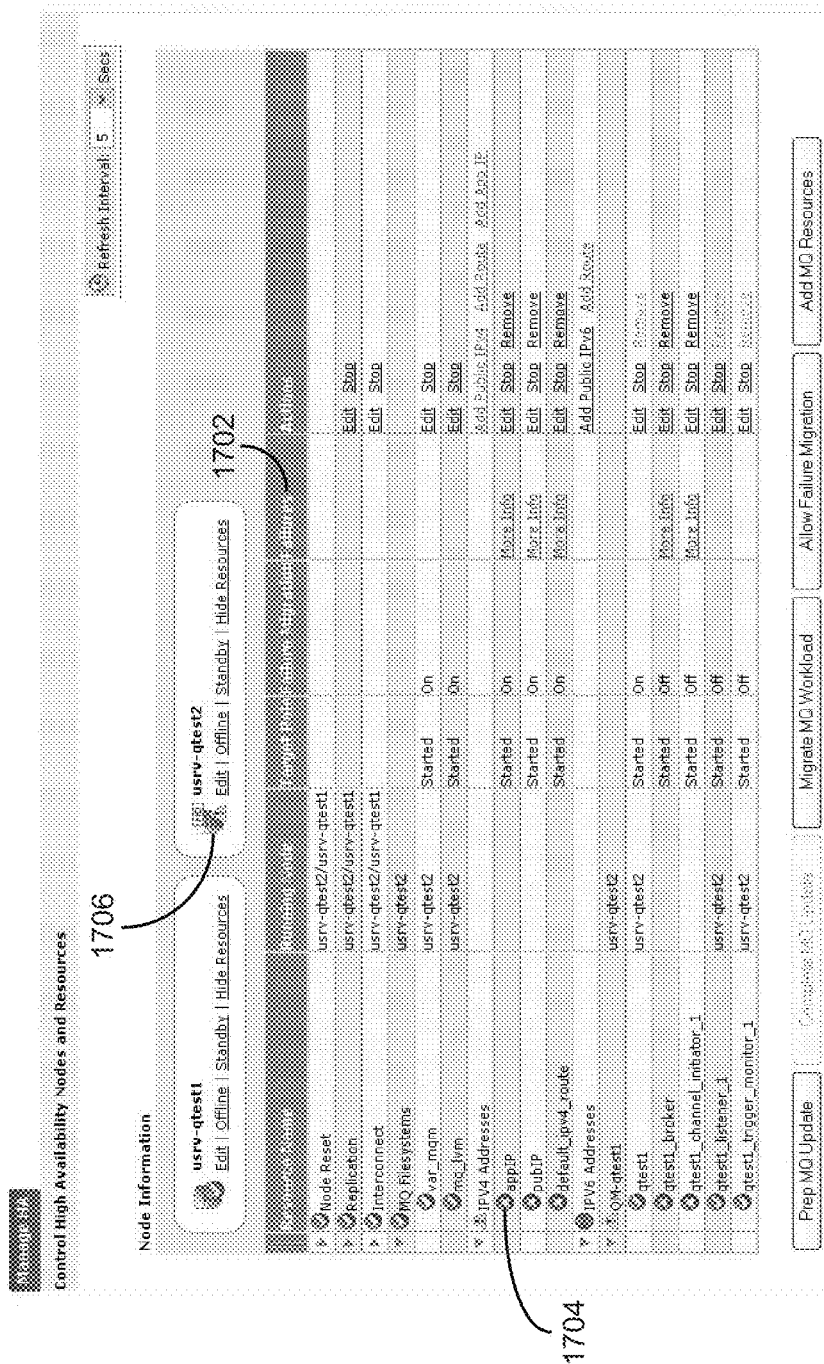

FIG. 17 illustrates a GUI 1700 for managing the cluster. The GUI 1700 is the main HA manage screen. In the particular example illustrated, a node is failing over. A Failure column 1702 has links to view failure information. A red X 1704 in the first column shows that the resource is not running. An exclamation point 1706 indicates that this node needs attention. The interface is complete with mouse-overs and on-line help.

Figure 18:
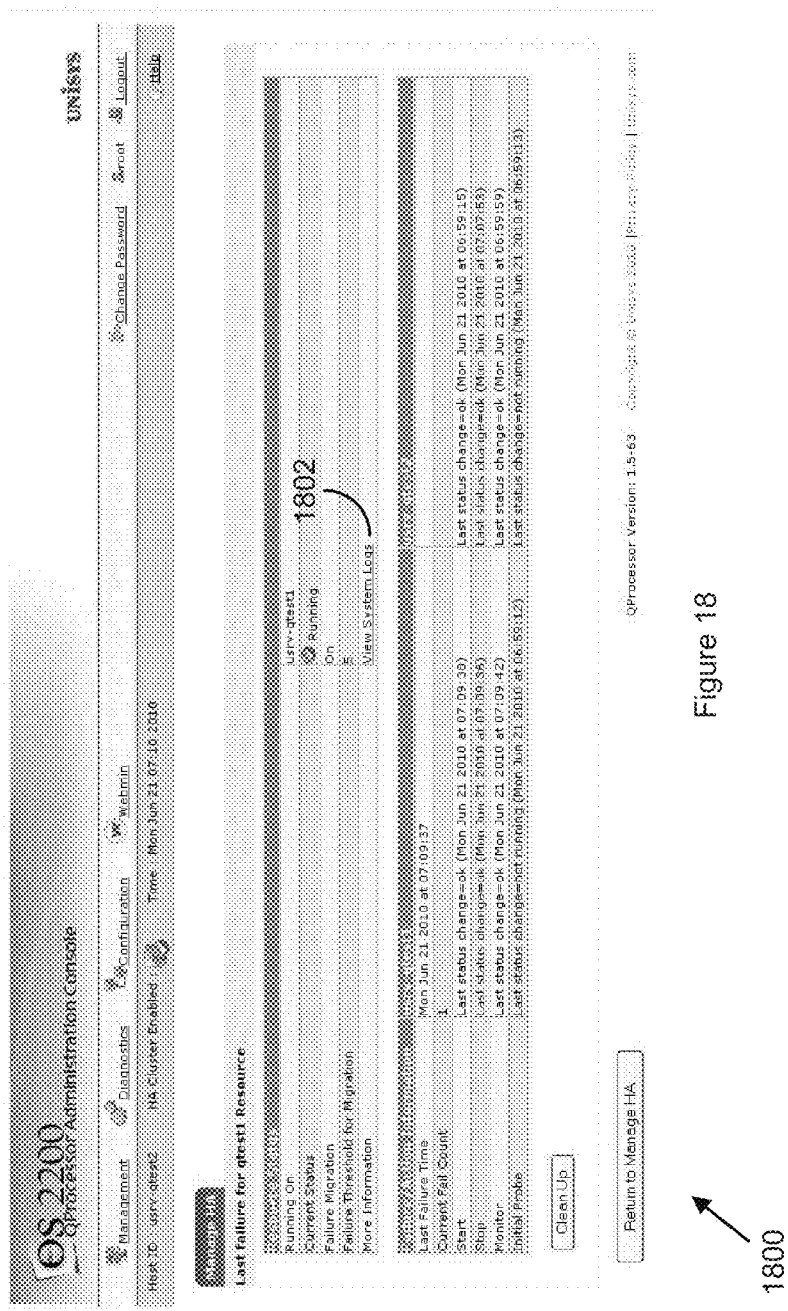
Figure 19:
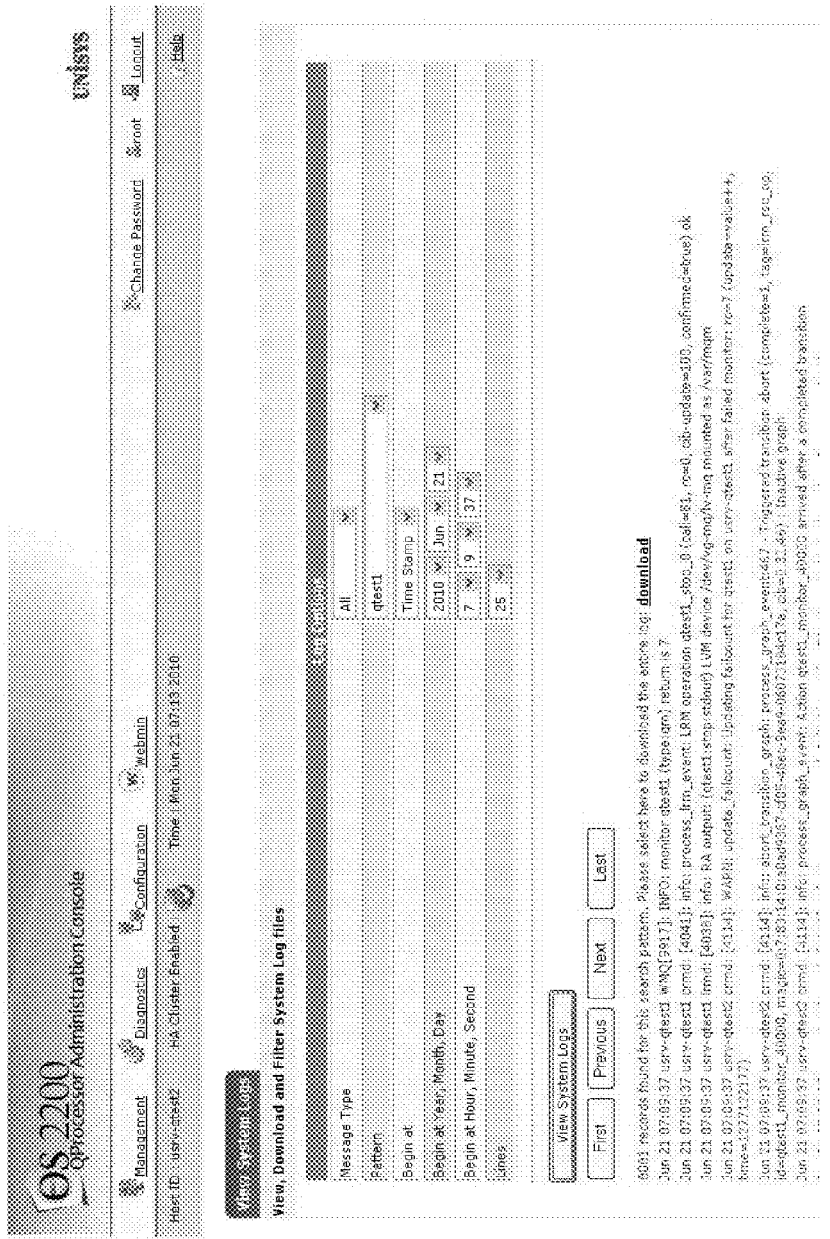

FIG. 18 illustrates a screen 1800 where last failures can be viewed and a View Systems Logs 1802 link allows the logs to be viewed. It shows the current status of the resource and the failure threshold. FIG. 19 illustrates a View Systems Logs page 1900. User defined patterns can be used, although it will default to the failed resource name. The logs present a combined view of logs from both nodes of the cluster. The user can also download the logs.

Figure 20:
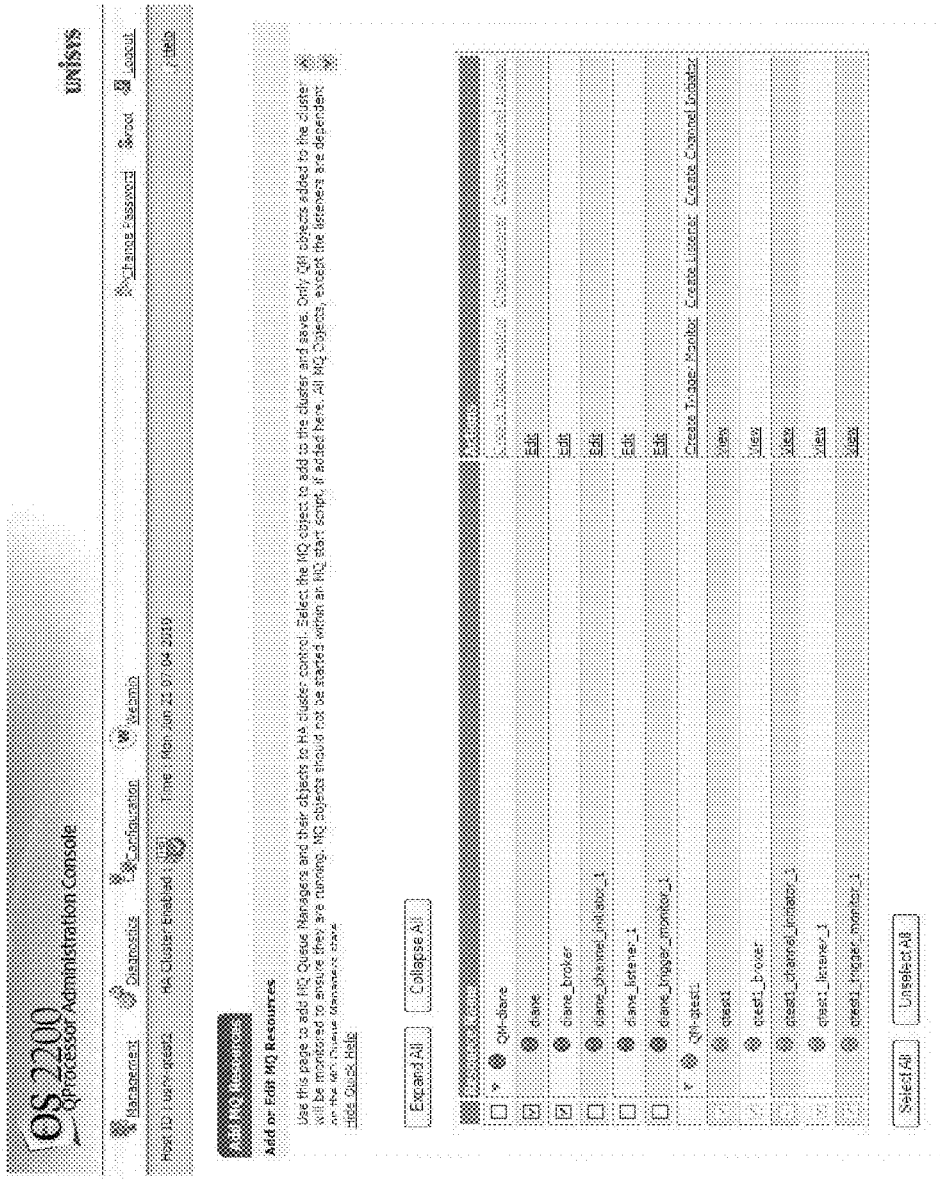
Figure 21:
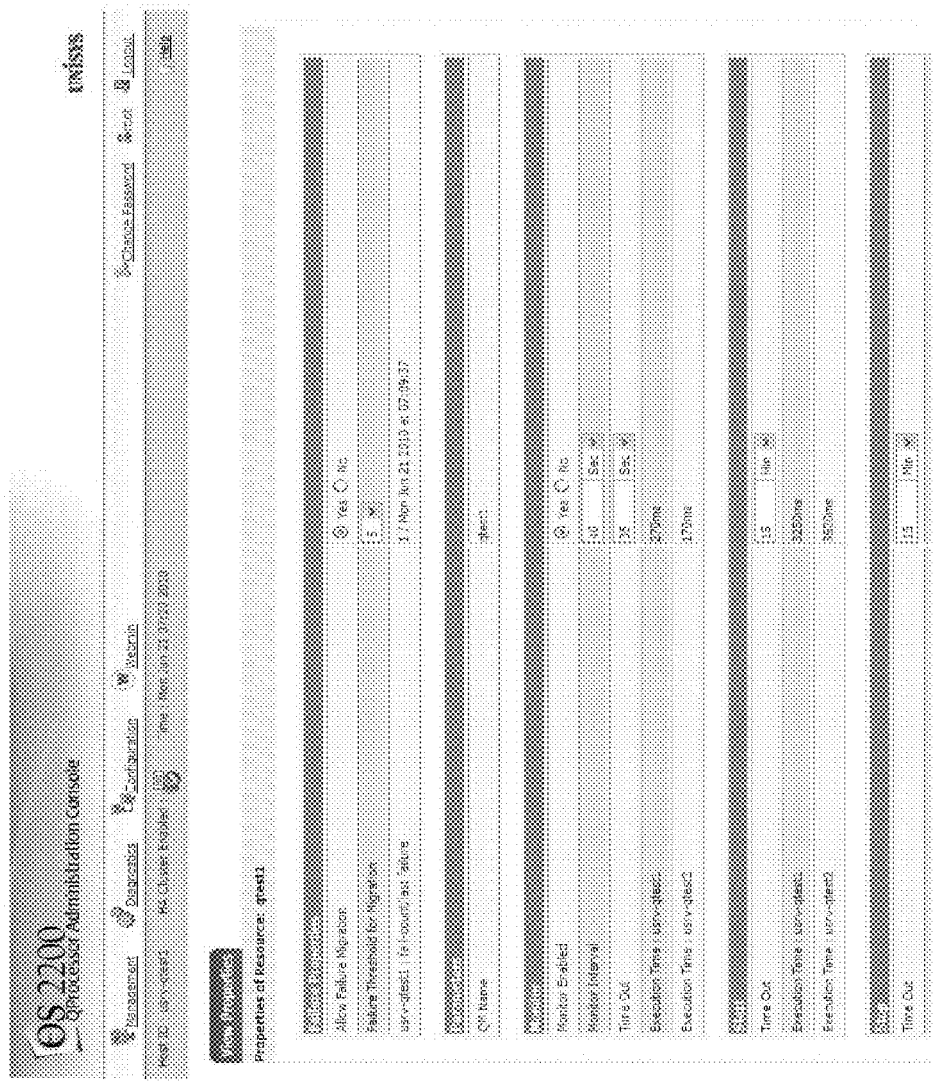

FIG. 20 illustrates a Add MQ Resources page 2000. Users can select previously defined MQ Queue Managers and their resources. They can be added under a HA cluster control. FIG. 21 illustrates a View Properties page 2100. All resources properties can be edited and timeout values can be tuned.

As mentioned above, a user using the Administration Console 514 and 524 and its GUI is not exposed to the Linux operations underneath. There are two ways to administer 510 and 520. One is to use the admin console GUI 541, described above. Such technique uses the Operations server 540 and uses TCP/IP to communicate between the operations server 540 and the nodes 510, 520.

Another way is to employ a process in the MQ daemon 532 referred to as UNX. Such technique uses the Interconnect 536 to start a remote shell from MQ Module 530 to communicate with nodes 510 and 520. This is referred to as "sandboxing" the user. Such functionality is used to maintain security policy and audits. There are also added scripts to ease debugging and administration of MQ. The system uses user id mappings from one node to the other so that the user id mappings maps security context from the OS 2200 to the Linux side. The system also confines users to specific files through scripts and wrappers, and keeps the user's tasks confined to a very limited environment to protect the rest of the environment.

The clustering operability utilizes MQ for much of its functionality. For instance, there is a process to facilitate recovery of lost queue manager from catastrophic disaster. MQ is used after failure to automate rebuilding of queue manager and saving current configuration.

There is also a methodology for backing up a queue manager with minimal down time and little or no user intervention. Such methodology uses LVM for the file system.

There is also an automated way on a scheduled basis to save MQ linear logs. Multiple ways to save (zip, delete, move) can be used, and can be configured with the Web interface of the GUI, 541 (FIGS. 12-15) of the Administration Console 514 and 524. There is also a MQ-PS tool that filters out MQ processes on a Linux system and gives snap shot of MQ activity.

For a high availability cluster solution to manage and monitor MQ queue managers and its components, a mechanism is required to properly monitor those queue managers and components. Currently, the only similar functionality exists in the Sun Cluster Data Service for Websphere MQ product. This product allows for monitoring of MQ queue managers and resources in a Sun HA cluster. It allows monitoring of MQ queue managers as well as specific objects under those queue managers including channel initiators, listeners, command servers, and trigger monitors.

As part of an overall HA solution of the present disclosure, there is created a 'qmstatus' tool that can determine the status of a queue manager and many of its components. The qmstatus tool is part of the nodes 510, 520 and reports to the WMQ OCF the current status of a queue manager or one of its components, which in turn reports status to the clustering framework. The qmstatus tool monitors queue managers as well as the following components of a queue manager— trigger monitors, channel initiators, listeners, brokers, and command servers, channels and the like.

When a queue manager or object of a queue manager is inquired upon, the qmstatus tool attempts to obtain the current status of the object in real time. The status is then returned to the caller. The status that can be returned includes running, not running, error, and configuration problems among others.

The following describes additional information related to each object type. For all object types (including queue managers themselves), if the object does not exist, an error status is returned. If various errors occur that cannot be recovered from, an error is returned. If the object (and its owning queue manager if applicable) exists and its status (running or not running) can be obtained, the appropriate status is returned. Additional information for certain object types:

Queue Managers—If the status is a 'transient' status such as 'starting' or 'ending' the tool waits until the status changes to a permanent status (running or not running) and returns that status at that point.

Listeners—Multiple listeners can be monitored. A multipoint check is done using operating system interfaces to verify the listener on the given port is connected to the network. Additional items that can be monitored include, but not limited to, MQ Brokers, Trigger Monitors and Channel Initiators.

Trigger Monitors—A MQ API interface is used to validate that the queue exists. If it does, its status can be obtained. With the status comes a list of "handles" to that queue. Each "handle" represents a user application that has the queue open. Using those handles, application names that match trigger monitors are searched for. The pid of the application, which is in the queue manager status output structure, is validated with the operating system that the pid is alive and matches the program name MQ asserted. If that passes, a trigger monitor exists and a "good" status is returned. If not, a "not running" or "error" is returned, depending on if nothing was found or if it could not be determined because of an error.

Channel Initiators—This follows the same basic logic in which a known channel initiator is searched for and validated that the pid is alive and what is expected.

Broker—If the queue has a status with the "inquire queue status" command, the handle info shows an application name that is expected, and the pid is alive a "running" is returned, otherwise an "error" or "not running" is returned.

To start and stop the MQ resources, normal MQ commands are wrapped with scripts that automate and customize the procedures. For starting of queue managers, the strmqm MQ command is used which has been wrapped to only allow access if a "Bypass_ha_checks" variable is set. This allows the WMQ OCF to access both starting and ending queue managers, where as other MQ administrators attempting to start the Queue Manager are denied access. This keeps control of starting a Queue Manger inside the Clustering Framework described herein.

When MQ resources are started, the WMQ OCF monitors the resource using the qmstatus tool to ensure it was started properly. The listener and channel initiator resources are started in the background and must be monitored to ensure they are started properly. The WMQ OCF continues to check the status of the resource in a predefined loop to give the MQ resources a chance to start up. This is needed since the clustering framework will begin the monitoring of each resource once it reports a successful start. If the resource takes too long to start as defined by a clustering resource start timeout, the clustering framework will terminate the process and try again.

The trigger monitor and channel initiator objects use another tool called qgetmod that enables and disables queues within the queue manager. This technique is used to "start" and "stop" these special queues.

To stop an MQ queue manager, the normal "endmqm" command is wrapped to allow access only if a special variable has been set. The WMQ OCF has access to this variable so access is allowed. Other means to control the MQ resources outside the cluster are denied since the variable is not set. This keeps control of stopping the queue manager inside the clustering framework.

To stop listener objects, a special script is used. This script will determine the pid of the listener for this port and queue manager. It then sends a sigkill signal to terminate the process. The trigger monitor and channel initiator objects use the qgetmod tool described above to disable access to the queues, which essentially stops them.

Figure 22:
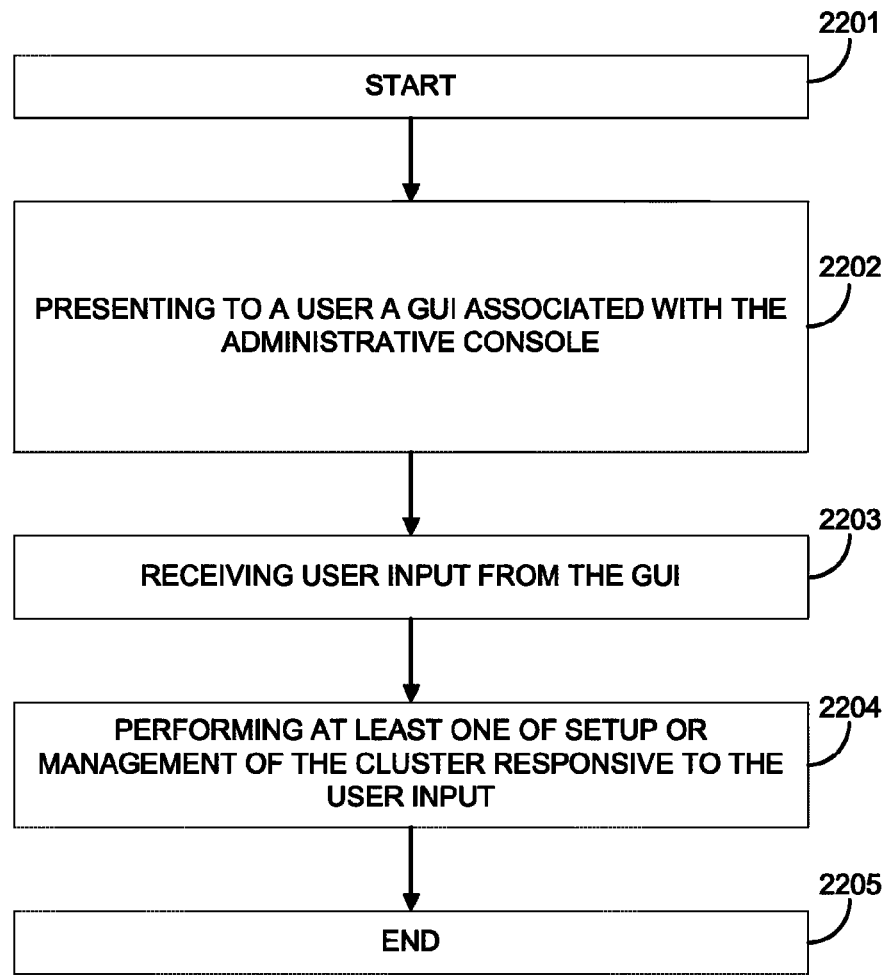
FIG. 22 is an illustration of an exemplary process adapted, according to one example embodiment of the present disclosure.

FIG. 22 is an illustration of an exemplary process 2200 adapted according to one embodiment. The process 2200 may be performed, for example, by an administrative console, such as the Administration Console 514 and 524 shown in FIG. 5.

The process begins at block 2201. In block 2202, a GUI associated with the administrative console is presented to a user. In block 2203, user input is received by the administrative console from the GUI. For example, the user input may include a button click, a box, check, or other GUI-type input. The user input may indicate configurations for the cluster, whether at cluster setup, during management of the cluster, during a change to the cluster, or any other time or may simply monitor/manage an existing cluster.

In block 2204, cluster set-up and/or management is performed responsive to the user input. The process 2200 ends at block 2205.

Various embodiments provide advantages over previous solutions. For instance, in previous solutions, a system administrator or team had to configure monitoring, resource assignment, and the like manually. Manual configuration can be a big task and may require several people with different, specialized backgrounds.

The administrative console provides a GUI to the user in which the user can set up and manage the cluster. Different tasks in setting up and configuring are predefined and discretely selectable in the GUI so that the user does not have to be familiar with the various tasks or perform the various tasks manually. The GUI runs in, e.g., a Linux environment, but hides the environment from the user. As a result, the GUI provides a familiar and easy to use alternative to previous manual techniques.

It is recognized that the above systems, and methods operate using computer hardware and software in any of a variety of configurations. Such configurations can include computing devices, which generally include a processing device, one or more computer readable media, and a communication device. Other embodiments of a computing device are possible as well. For example, a computing device can include a user interface, an operating system, and one or more software applications. Several example computing devices include a personal computer (PC), a laptop computer, or a personal digital assistant (PDA). A computing device can also include one or more servers, one or more mass storage databases, and/or other resources.

A processing device is a device that processes a set of instructions. Several examples of a processing device include a microprocessor, a central processing unit, a microcontroller, a field programmable gate array, and others. Further, processing devices may be of any general variety such as reduced instruction set computing devices, complex instruction set computing devices, or specially designed processing devices such as an application-specific integrated circuit device.

Computer readable media includes volatile memory and non-volatile memory and can be implemented in any method or technology for the storage of information such as computer readable instructions, data structures, program modules, or other data. In certain embodiments, computer readable media is integrated as part of the processing device. In other embodiments, computer readable media is separate from or in addition to that of the processing device. Further, in general, computer readable media can be removable or non-removable. Several examples of computer readable media include, RAM, ROM, EEPROM and other flash memory technologies, CD-ROM, digital versatile disks (DVD) or other optical storage, magnetic cassettes, magnetic tape, magnetic disk storage or other magnetic storage devices, or any other medium that can be used to store desired information and that can be accessed by a computing device. In other embodiments, computer readable media can be configured as a mass storage database that can be used to store a structured collection of data accessible by a computing device.

A communications device establishes a data connection that allows a computing device to communicate with one or more other computing devices via any number of standard or specialized communication interfaces such as, for example, a universal serial bus (USB), 802.11a/b/g network, radio frequency, infrared, serial, or any other data connection. In general, the communication between one or more computing devices configured with one or more communication devices is accomplished via a network such as any of a number of wireless or hardwired WAN, LAN, SAN, Internet, or other packet-based or port-based communication networks.

The above specification, examples and data provide a complete description of the manufacture and use of the composition of the invention. Since many embodiments of the invention can be made without departing from the spirit and scope of the invention, the invention resides in the claims hereinafter appended.

The invention claimed is:
1. A system comprising:
a first node of a cluster that includes:
a Linux operating system;
administration console software;
interconnect software for communicating with a second operating system, running on a separate non-Linux hardware platform; and
wherein the first node can be configured and managed in the cluster by the second operating system;
a second node of the cluster that includes:
a Linux operating system;
administration console software; and
interconnect software for communicating with the second operating system, running on the separate non-Linux hardware platform;
wherein the second node can be configured and managed in the cluster by the second operating system and can take-over as an active node in case of a failure on the first node; and
a server that includes:
a software module for setting up and managing the cluster, wherein the software module runs scripts on the Linux operating system to manage the cluster and to configure the cluster by providing a highly available set of resources in a daemon within the second operating systems along with requisite dependencies and constraints for proper functioning.

2. The system of claim 1, further comprising:
two network devices configured such that if one fails, the other takes over seamlessly;
dual port fibre channel interfaces for connection to optional storage area network; and
dual core Intel processors.

3. The system of claim 1, further comprising:
raided disks so that data is protected on a single box; and
two AM LAN switches that provide communication to the separate hardware platform.

4. The system of claim 1, wherein a central console is operating in the second operating system that receives alert messages from the Linux operating system.

5. The system of claim 1, wherein the first and second nodes can be implemented as a high-availability cluster communicating with the second operating system.

6. The system of claim 1, wherein the scripts configure the cluster by providing a highly available set of MQ resources in a MQ daemon along with requisite dependencies and constraints for proper functioning.

7. The system of claim 1, wherein the software module includes a graphical-user interface.

8. The system of claim 7, wherein the graphical-user interface allows a user to select from a pre-defined set of options to configure the cluster.

9. The system of claim 8, wherein the graphical-user interface allows a user to visually see the health of all components of the cluster.

* * * * *